US012724998B2

(12) United States Patent
Alfia

(10) Patent No.: US 12,724,998 B2
(45) Date of Patent: Sep. 1, 2026

(54) SYSTEM, DEVICE, AND METHOD FOR COMMUNICATION WITH SPECIFIC INFORMATION

(71) Applicant: Safe On Our Watch LLC, Dallas, TX (US)

(72) Inventor: Adam Alfia, Dallas, TX (US)

( * ) Notice: Subject to any disclaimer, the term of this patent is extended or adjusted under 35 U.S.C. 154(b) by 0 days.

(21) Appl. No.: 18/981,359

(22) Filed: Dec. 13, 2024

(65) Prior Publication Data

US 2025/0200317 A1 Jun. 19, 2025

Related U.S. Application Data

(60) Provisional application No. 63/550,075, filed on Feb. 6, 2024, provisional application No. 63/612,915, filed on Dec. 20, 2023, provisional application No. 63/610,335, filed on Dec. 14, 2023.

(51) Int. Cl.
*G06K 19/04* (2006.01)
*G06K 19/07* (2006.01)

(52) U.S. Cl.
CPC ....... *G06K 19/041* (2013.01); *G06K 19/0723* (2013.01)

(58) Field of Classification Search
CPC ......................... G06K 19/041; G06K 19/0723
USPC .......................................................... 235/492
See application file for complete search history.

(56) References Cited

U.S. PATENT DOCUMENTS

| | | | | |
|---|---|---|---|---|
| 9,443,454 | B1 * | 9/2016 | Treece | G09F 7/18 |
| 10,404,324 | B1 * | 9/2019 | Giovannini | G06Q 10/087 |
| 2014/0285335 | A1 * | 9/2014 | Haas | G08B 21/0423 340/500 |
| 2017/0017866 | A1 * | 1/2017 | Nithianand | G06F 3/1285 |
| 2017/0034859 | A1 * | 2/2017 | Yao | H04W 76/11 |
| 2018/0109947 | A1 * | 4/2018 | Kim | H04W 12/041 |
| 2019/0029069 | A1 * | 1/2019 | Shim | H04W 48/08 |
| 2020/0134412 | A1 * | 4/2020 | Lyle | G06K 19/0723 |
| 2021/0112959 | A1 * | 4/2021 | Young | B26B 1/10 |
| 2022/0409053 | A1 * | 12/2022 | Taub | G16H 50/50 |
| 2023/0186708 | A1 * | 6/2023 | Heller | G06K 7/10722 235/382 |
| 2023/0384128 | A1 * | 11/2023 | Averill | F16G 11/025 |
| 2023/0414317 | A1 * | 12/2023 | Trivisani | A61B 17/122 |
| 2024/0189185 | A1 * | 6/2024 | Abal | G07C 9/00309 |
| 2024/0277151 | A1 * | 8/2024 | Ang | A47C 31/11 |
| 2025/0171264 | A1 * | 5/2025 | Balsells Mercade | B26D 3/282 |

* cited by examiner

*Primary Examiner* — Allyson N Trail
(74) *Attorney, Agent, or Firm* — J. Andrew Reed; Think Differently Legal, PLLC

(57) ABSTRACT

The present disclosure includes a system, method and device for communication utilizing a near field communication (NFC) device. That NFC device can have a computing device, a multi-channel communications device, a communications bus, an energy conditioner, and a power storage device. All of these can be secured within a housing that can be scanned, tagged, or communicated with via a user communications device that can be activated by the NFC device when held in close proximity of the housing. The placement activates a set of communications protocols where the user communications device communicates with the NFC device. The user device can then display relevant information to the user based on the information stored on the NFC device.

19 Claims, 21 Drawing Sheets

SYSTEM, DEVICE, AND METHOD FOR COMMUNICATION WITH SPECIFIC INFORMATION

CROSS-REFERENCE TO RELATED APPLICATIONS

This application claims the benefit of U.S. Provisional Application No. 63/610,335 filed Dec. 14, 2023, the disclosure of which is incorporated herein by reference for all purposes.

This application claims the benefit of U.S. Provisional Application No. 63/612,915 filed Dec. 20, 2023, the disclosure of which is incorporated herein by reference for all purposes.

This application claims the benefit of U.S. Provisional Application No. 63/550,075 filed Feb. 6, 2024, the disclosure of which is incorporated herein by reference for all purposes.

BACKGROUND

Technical Field

The present disclosure relates to communication systems. More particularly, and not by way of limitation, the present disclosure is directed to a system, device, and method for communicating through near-field communication devices placed in unique housings.

Description of Related Art

In our ever increasing digital world, some of the most basic of tasks and items are still non-digital. For example, car manuals, grocery coupons and reward signups, and medicine information.

It would be advantageous to have a system, device, and method for communicating through near-field communication devices placed in unique housings that overcomes the disadvantages of the prior art. The present disclosure provides such a system and method.

BRIEF SUMMARY

The present disclosure includes a system for communication utilizing a near field communication (NFC) device. That NFC device can have a computing device, a multichannel communications device, a communications bus, an energy conditioner, and a power storage device. All of these can be secured within a housing that can be scanned, tagged, or communicated with via a user communications device that can be activated by the NFC device when held in close proximity of the housing.

Thus, in one aspect, the present disclosure is directed to a communication device that includes a computing device and a multichannel communication device that are coupled together. The coupling can occur through a communications bus that allows for various different communication methods in single or multiplexing. All of this needs power, which can be provided through a power conditioner and an energy storage device.

In another aspect, the present disclosure is directed to a method of communication when a user communication device is placed in close proximity of a near field communication (NFC) device. The placement activates a set of communications protocols where the user communications device communicates with the NFC device. The user device can then display relevant information to the user based on the information stored on the NFC device.

Other aspects, embodiments and features of the present disclosure will become apparent from the following detailed description when considered in conjunction with the accompanying figures. In the figures, each identical, or substantially similar component that is illustrated in various figures is represented by a single numeral or notation. For purposes of clarity, not every component is labeled in every figure. Nor is every component of the disclosure shown where illustration is not necessary to allow those of ordinary skill in the art to understand the disclosure.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Embodiments of the disclosure will now be described.

Figure 1:
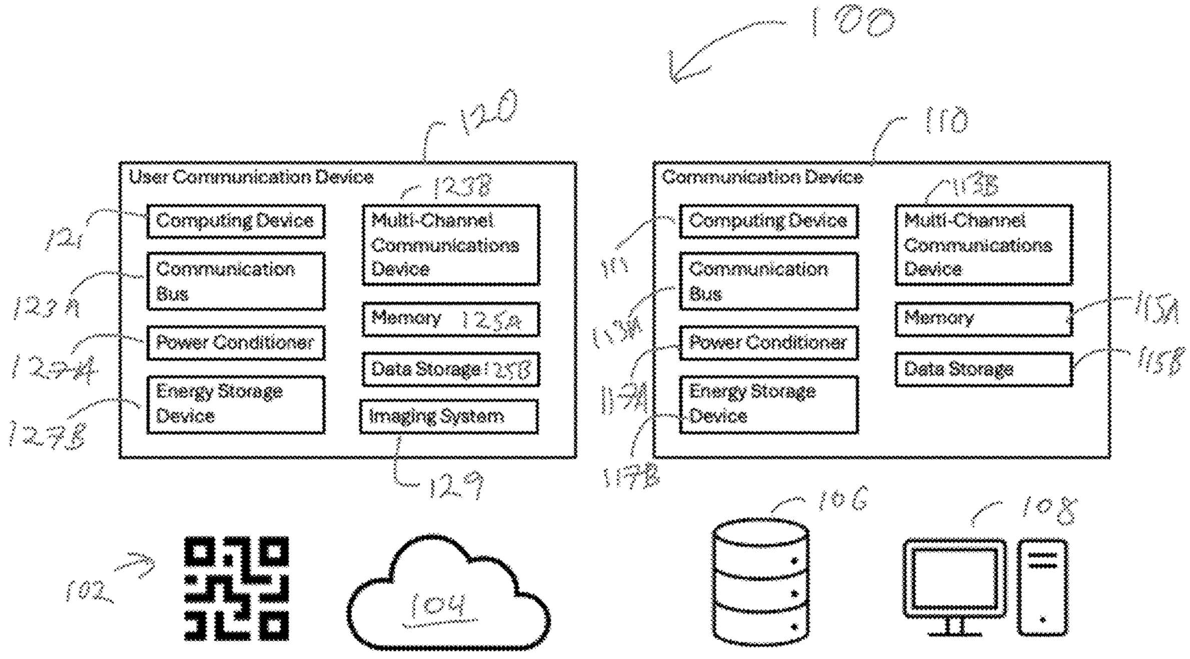
FIG. 1 is a system diagram illustration of a communication system.

FIG. 1 is a system diagram illustration of a communication system 100. The communication system 100 can include a communication device 110 and a user communication device 120. In at least one example, the communication device 110 can include a computing device 111, a communication bus 113A, a multi-channel communication device 113B, a set of memory 115A, a set of data storage 115B, a power conditioner 117A, and an energy storage device 117B. Similarly, the user communication device 120 can include a computing device 211, a communication bus 123A, a multi-channel communication device 123B, a set of memory 125A, a set of data storage 125B, a power conditioner 127A, and an energy storage device 127B.

In at least one embodiment, the user communication device 120 can be activated using the multi-channel communications device 113B of the communication device 110, while in other example, the imaging system 129 of the user communication device 120 can be utilized to access a quick response code 102. These activations can allow the user communication device 120 to use its multi-channel communications device 123B to connect via an internet (Wi-Fi, Lo-Fi, 3G, LTE, 5G, cellular connection, or other communications protocol (symbolized by cloud 104), to a set of servers 106 and/or a computing device 108.

For example, a user can place a user communication device in close proximity of a near-field communication (NFC) device or communication device. The close proximity allows for the activation of a set of communications protocols when the user communications device communicates with the NFC device. The communication can allow for a URL or other information that is relevant to be displayed to the user, that information could be data stored on the NFC device, or on a website/web server and may also be cross-referenced with information stored or accessed through the user communication device (weather or location for example). It would be understood that the communication device 110 and the user communication device 120 may interact with systems like those described in U.S. patent application Ser. No. 17/313,872 and U.S. patent application Ser. No. 18/113,880 both of which are incorporated by reference for all purposes.

Figure 2:
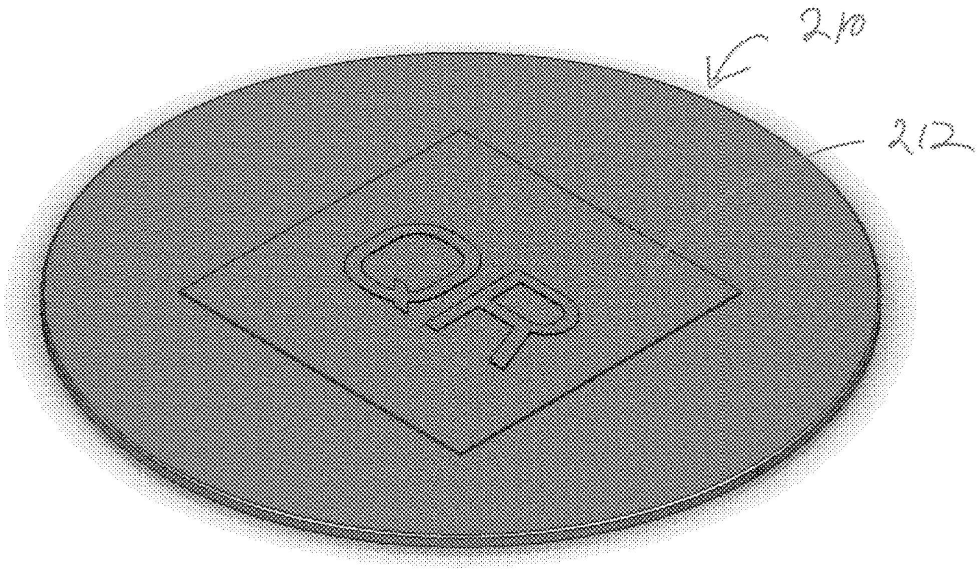
FIG. 2 is a perspective illustration of a communications device.

FIG. 2 is a perspective illustration of a communications device 210. In at least one embodiment, the communications device is a Near Field Communications (NFC) device. The communications device 210 can allow for radio or other electromagnetic communications protocols. In some examples, this may be done through a packet or waveform transmission protocol and can be updated from time to time to allow for efficiency of communication. In at least one example, a post or cylinder can be added to the bottom of the communications device 210 to create a ball marker for golf or other sports.

The communications device 210 may be round or circular in shape, while in other examples, it may also be a square or other polygon with a desired thickness that allows for efficient positioning of the internal components. The thickness of the communications device 100 can allow for the packaging of components that allow for communications to occur and also allow for there to be an efficient thermal transfer of any heat generated by the components. Additionally, there may be an additional advertising or communications space 212 that allows for a Quick Response (QR) code or other visible communications protocol to be added to the communications device 210 as an alternative to an NFC or similar communication device.

FIGS. 3A-3F are illustrations of a clip 340 in various views and each of these drawings may include portions of that discussed with relation to this set of figures but it would be understood that not every portion may be visible in each of FIGS. 3A-3F. Clip 340 may be the communications devices 110 and 210 from FIGS. 1 & 2. The clip 340 can contain a communication device embedded within the clip to allow it to objects that have a flat or relatively flat surface, for example a sun visor, cap or hat. As an example, the clip 340 is designed to securely engage with a surface while allowing the communication device to be easily accessible for scanning and/or communication. The clip 340 may be made of metal, plastic, or other combinations of materials that ensure durability and usability. The embedded communication device, allows for writable and editable digital records with information such as a Uniform Record Locator (URL) or other digital identifier that is linked to a specific website or digital content, and in some examples may be encrypted. A user communication device (not illustrated) can access the URL or other digital identifier by scanning, tagging, or otherwise communicating with the cap, allowing the URL website and/or other digital identifiers to be displayed to a user via the user communication device, which can be, but is not limited to, a smartphone, tablet, or other web enabled device.

Figure 3A:
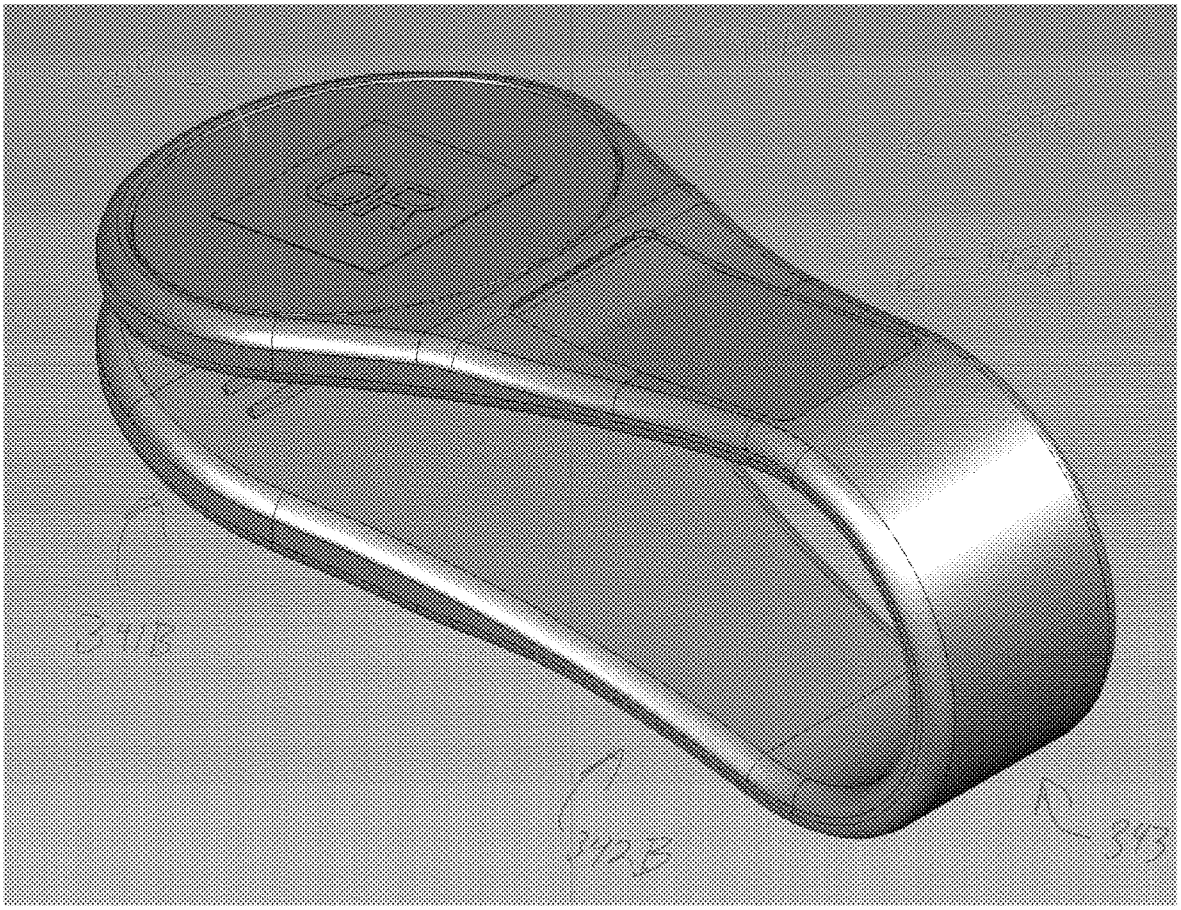
FIG. 3A is a perspective view of a clip.

Looking at each of the figures, FIG. 3A is a perspective view of the clip 340, where the clip 340 may have a first chip section 341A, a first connection section 342A, an inflection section 343, a second connection section 342B, and a second chip section 341B. In some examples, a communication device 310 may be embedded or engaged with the first or second chip section(s) 341A/341B. While illustrated in this example as a pressed in, clipped in, or engaged in communication device 310, there may be other versions of this device where the communication device 310 is not visible to a user because of it being embedded within the first or second chip section(s) 341A/341B.

Figure 3B:
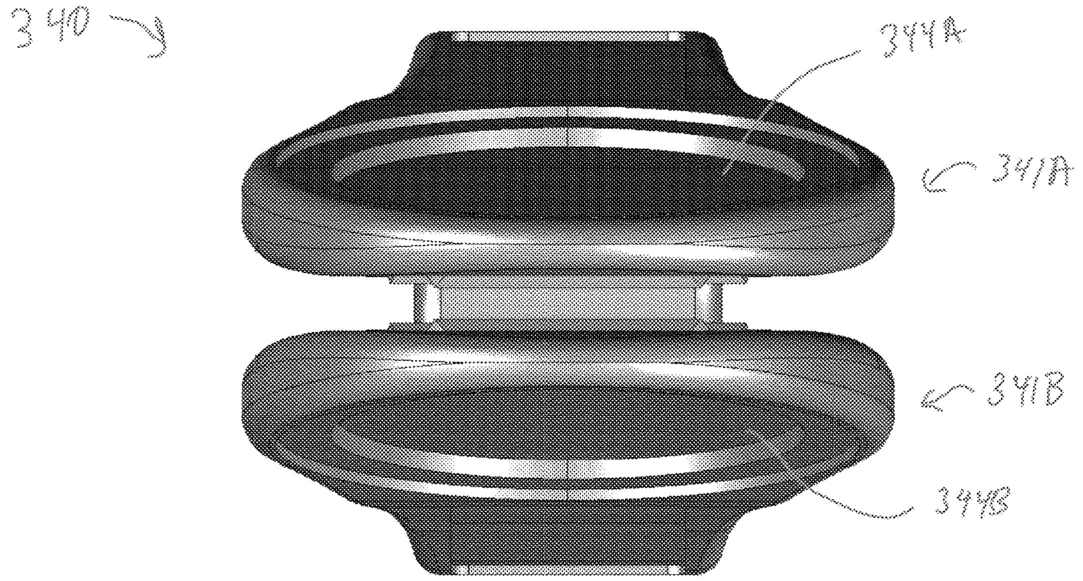
FIG. 3B is a front-view illustration of the clip.

FIG. 3B is a front view illustration of the clip 340, in this view, the communication device 310 is not present and a receiving void 344A/344B can be seen on first and second chip section 341A/341B respectively. This receiving void 344A/344B (collectively receiving void 344) can be utilized to engage a communications device 310 or other component that allows for communication or advertising. For example, if a communication device 310 is not used, a branded chip sized to fit and/or be engaged with the receiving void 344 can be utilized. This can allow brands to engage with their audiences without necessitating an electronic communications system to be utilized, while allowing the brand to later incorporate electronic communications into the clip 340.

Figure 3C:
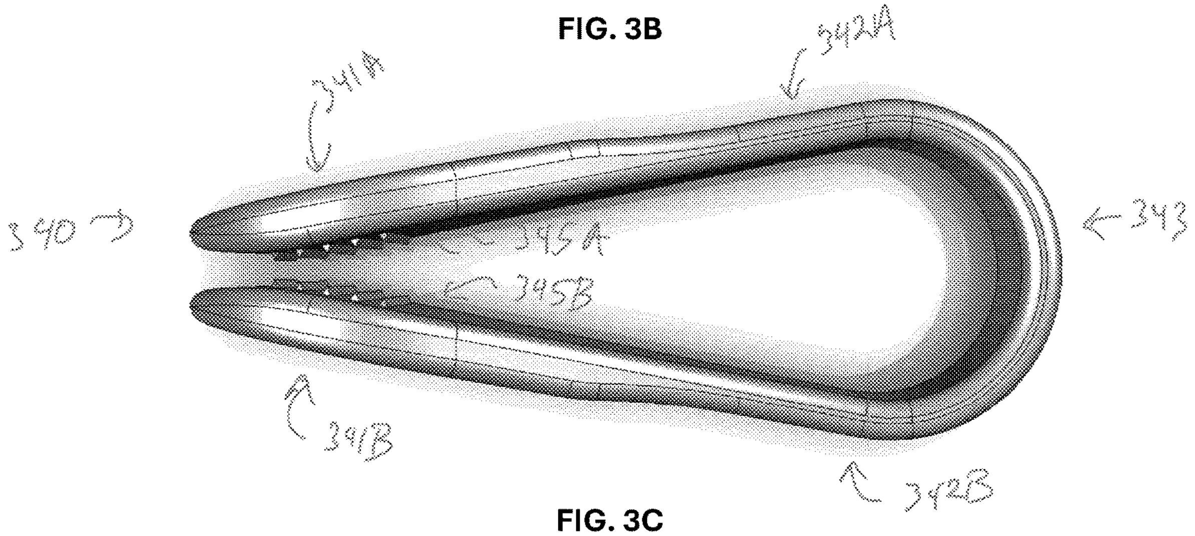
FIG. 3C is a side-view illustration of the clip.

FIG. 3C is a side view illustration of the clip 340. The chip sections 341A/341B can be sized with a thickness that allows for the communications device 310 be received and also have thermal efficiency. It is known that in the electronics industry that systems need to allow for proper cooling and/or airflow, as well as water resistance integrity (some may need to be water proof, while others only need to be water resistant). On the opposite side (meaning the internal side of the clip 340) of the chip sections 341A/341B can be a set of interface devices 345A/345B. The set of interface devices 345A/345B may include any number of shapes or dimensions that allow for there to be an interface with other device, system, or element. For example, the clip 340 may interface with a sun visor in a car, or with a cap or hat, or other items that are larger than the gap between the set of interface device 345A/345B. To describe an embodiment of clip 340, the thicker first and section chip section 341A/341B are coupled to respective first and section connection sections 342A/342B, which are then coupled by the inflection section 343. The connection sections 342A/342B and the inflection section 343 are generally thinner than the clip sections 341A/341B, and similarly, the ends of the connection sections 342A/342B that are coupled to the inflection section 343 are higher and lower (further apart) that the ends of the connection section 342A/342B that are coupled to the clip section(s) 341A/341B. The inflection section 343 is generally a loop that allows for the clip 340 to be open on one side (between the clip sections 341A/341B) while remaining closed on the other side.

Figure 3D:
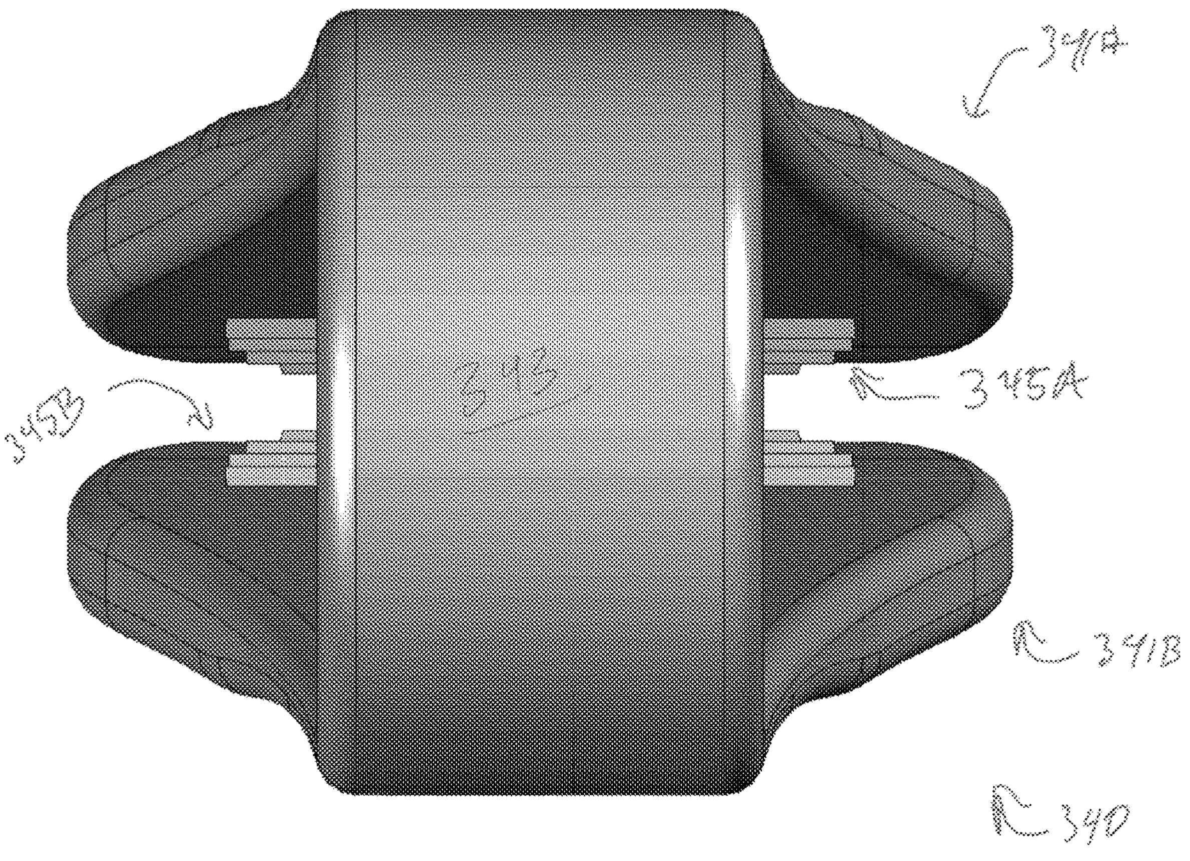
FIG. 3D is a rear-view illustration of the clip.

FIG. 3D is a rear view illustration of the clip 340. The rear view illustration allows for the width of the clip 340 to be seen. For example, the chip sections 341A/341B are generally wider than the connection sections (not illustrated but seen in FIGS. 3A-3C as connection sections 342A/342B) and the inflection section 343. While illustrated as not extending the full width of the chip section 341A/341B, the set of interface devices 345A/345B may in some examples extend across the clip sections 341A/341B, or be orientated in a different direction.

Figure 3E:
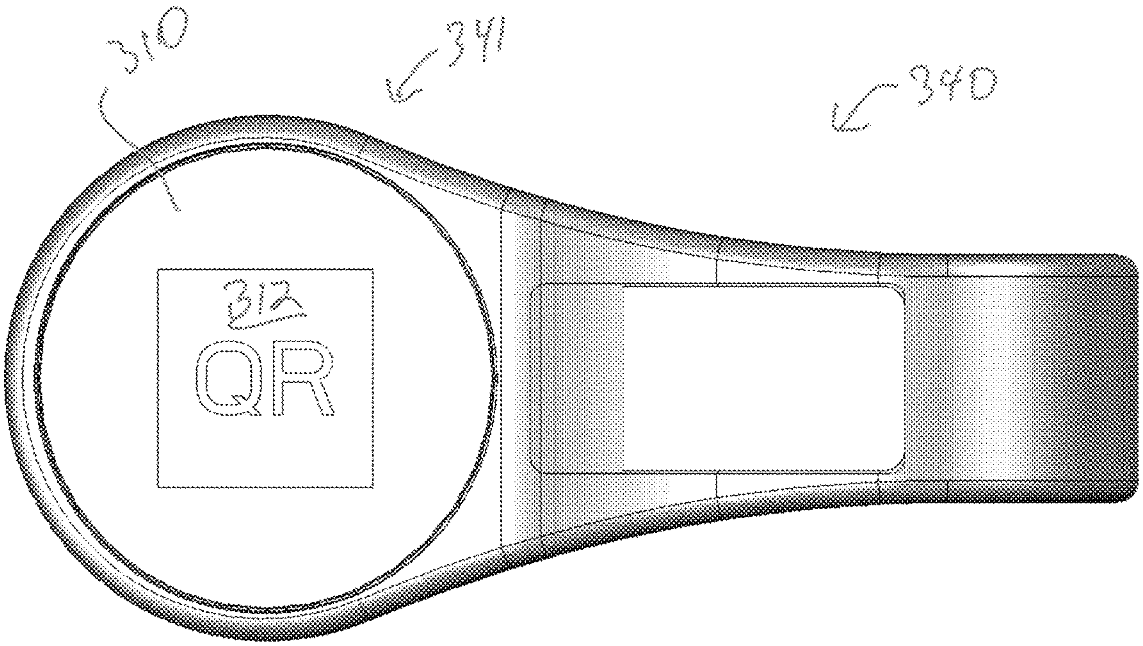
FIG. 3E is a top-view illustration of the clip with a communication device present.
Figure 3F:
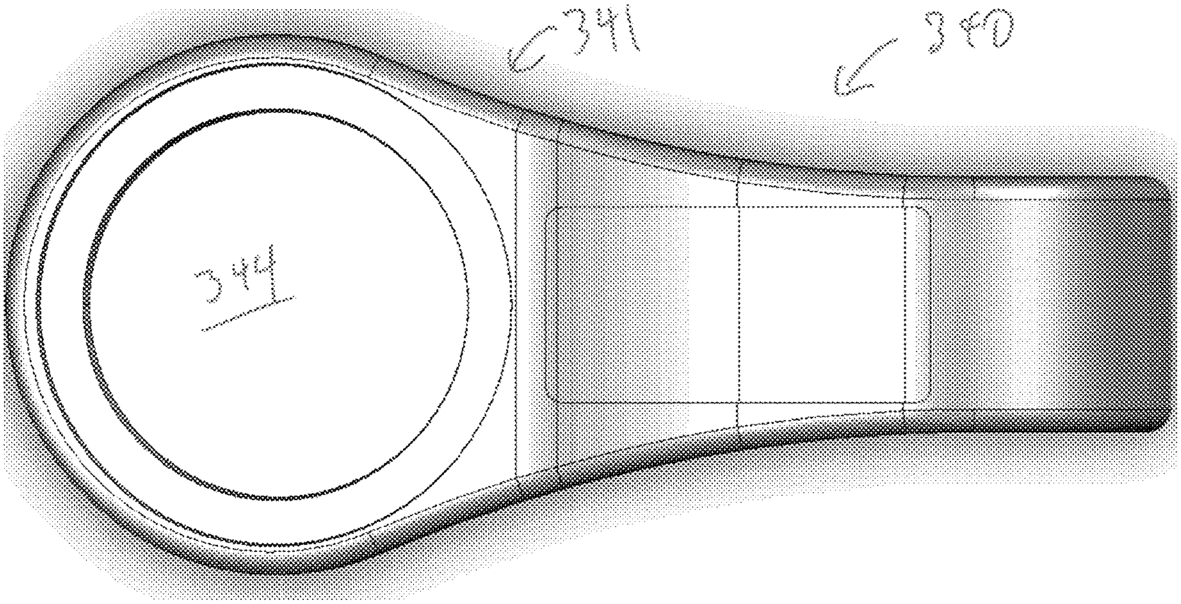
FIG. 3F is a top-view illustration of the clip without a communication device present.

FIGS. 3E and 3F are both top view illustrations of a clip 340 and allow for a contrast comparison of the chip sections 341A/341B. In particular, with FIG. 3E illustrating a communication device 310 being present and including an advertising or communications space 312, while in FIG. 3F the clip 340 has a receiving void 344A/344B configured to receive a communication device as illustrated in FIG. 3E.

FIGS. 4A-4D are illustrations of a cap 460. The cap 460 may be the communications device 110 and 210 from FIGS. 1 & 2. Similarly, the cap 460 may also include elements and/or components of the clip 340 illustrated by FIGS. 3A-3F. The cap 460 can contain a communication device embedded within the cap to allow it to be used with liquids and other items contained within bottles such as but not limited to medicine, hobby or crafting materials, and dangerous components. As an example, the cap 460 is designed to securely close the top of a bottle while allowing the communication device to be easily accessible for scanning and/or communication. The cap 460 may be made of metal, plastic, or other combinations of materials that ensure durability and usability. The embedded communication device, allows for writable and editable digital records with information such as a Uniform Record Locator (URL) or other digital identifier that is linked to a specific website or digital content, and in some examples may be encrypted. A user communication device (not illustrated) can access the URL or other digital identifier by scanning, tagging, or otherwise communicating with the cap, allowing the URL website and/or other digital identifiers to be displayed to a user via the user communication device, which can be, but is not limited to, a smartphone, tablet, or other web enabled device.

Figure 4A:
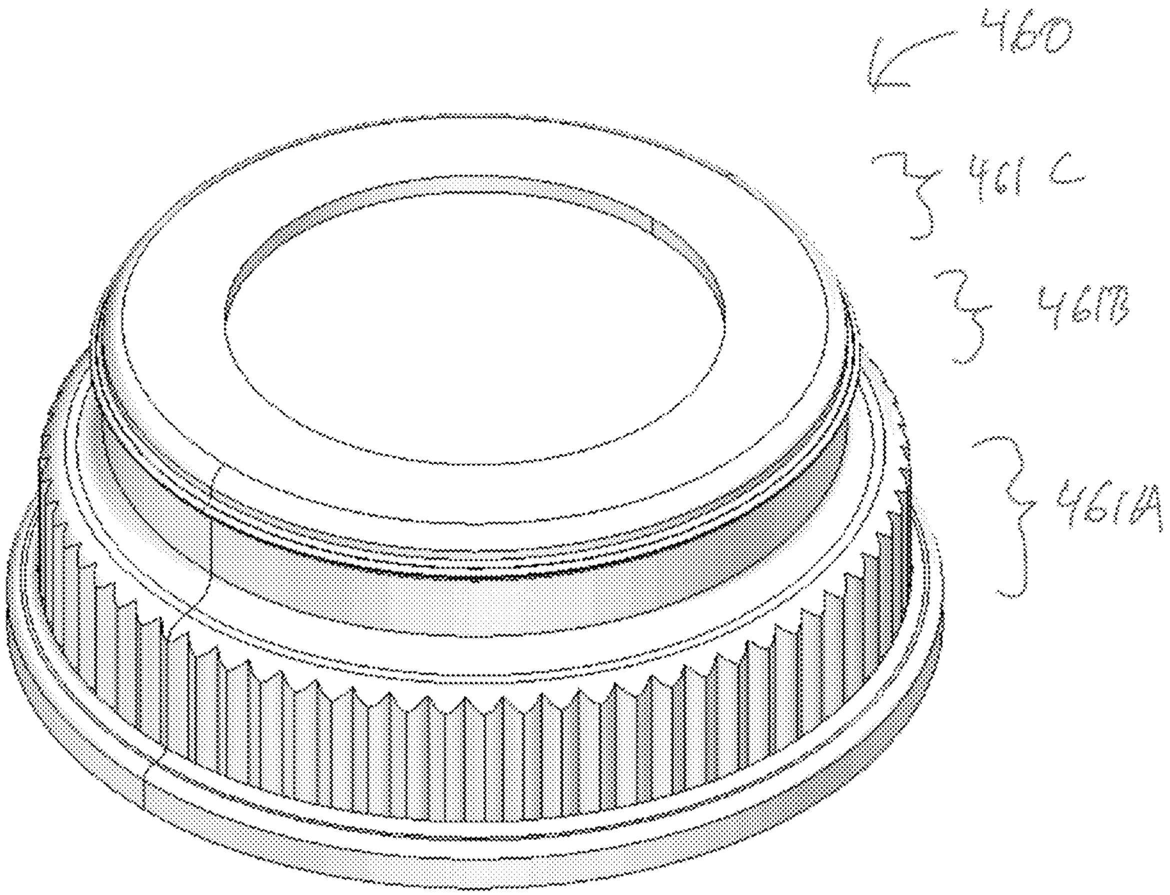
FIG. 4A is a perspective-view illustration of a cap.
Figure 4B:
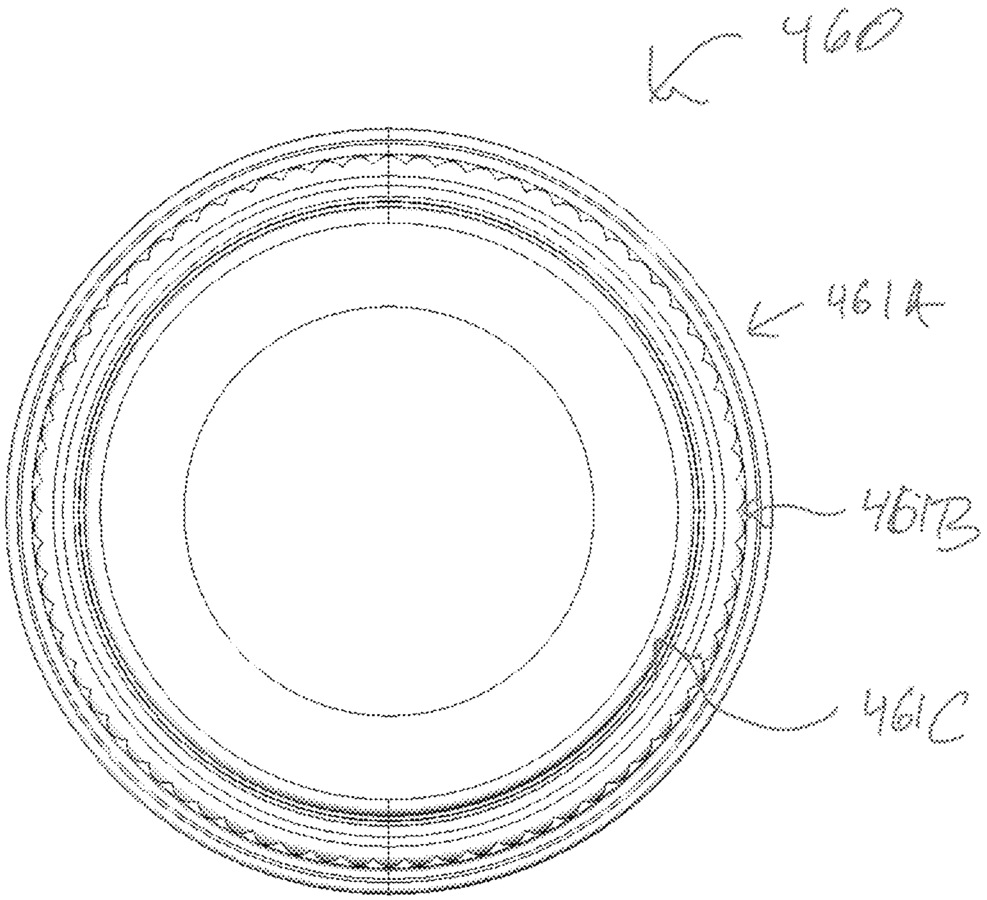
FIG. 4B is a top-view illustration of the cap.
Figure 4C:
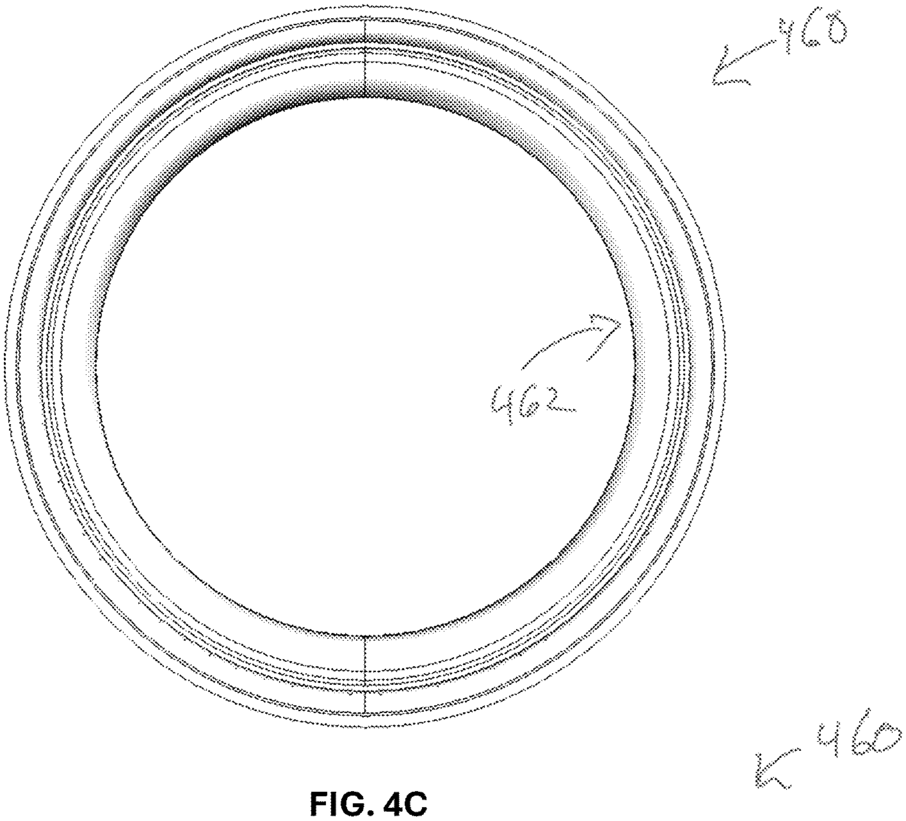
FIG. 4C is a bottom-view illustration of the cap, with threads being visible within the cap.
Figure 4D:
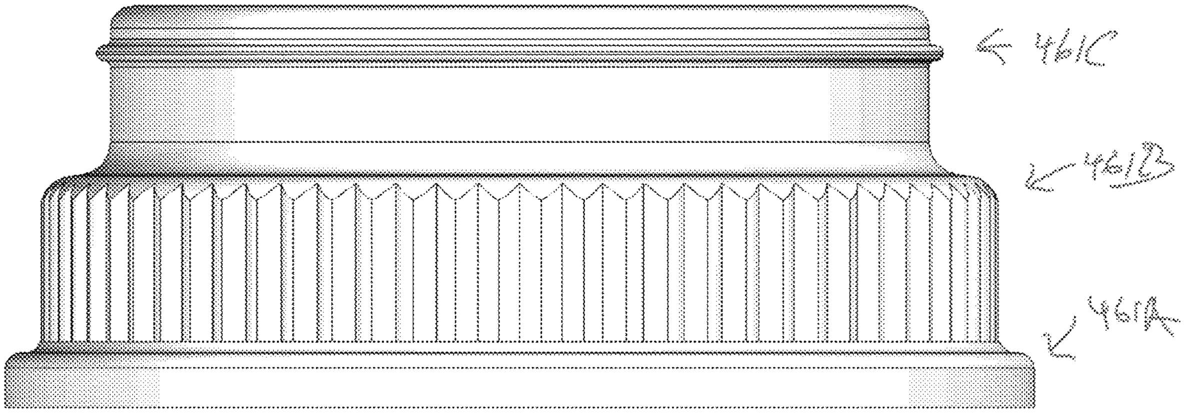
FIG. 4D is a side-view illustration of the cap.

FIG. 4A is a perspective view illustration of a cap 460. FIG. 4B is a top view illustration of the cap 460. FIG. 4C is a bottom view illustration of the cap 460, with threads 462 being visible within the cap 460. FIG. 4D is a side view illustration of the cap 460. With respect to these illustrations, the cap 460 can have multiple sections, for example, a lower or attachment section 461A, a middle or layer section 461B, and/or a top or chip section 461C. In some examples, one or more section may be missing or indistinguishable from other sections, due to little or no differences in the radius or other size or dimensional characteristics of the cap 460. The lower or attachment section 461A can have a gripping surface along the outer surface, and a threads or threaded channel on its internal surface to allow for it to engage with a bottle or other receiving unit. The middle or layer section 461B, in some examples, may allow for there to be increased space within the internal area of the cap 460 for embedded components such as a communications device or other electronic components. The top or chip section 461C can contain the communications device such as but not limited to a Near Field Communication (NFC) chip. In some examples, the top or chip section 461C and the middle or layer section 461B may create a pocket between them that allows for the communication device to be embedded.

Figure 5A:
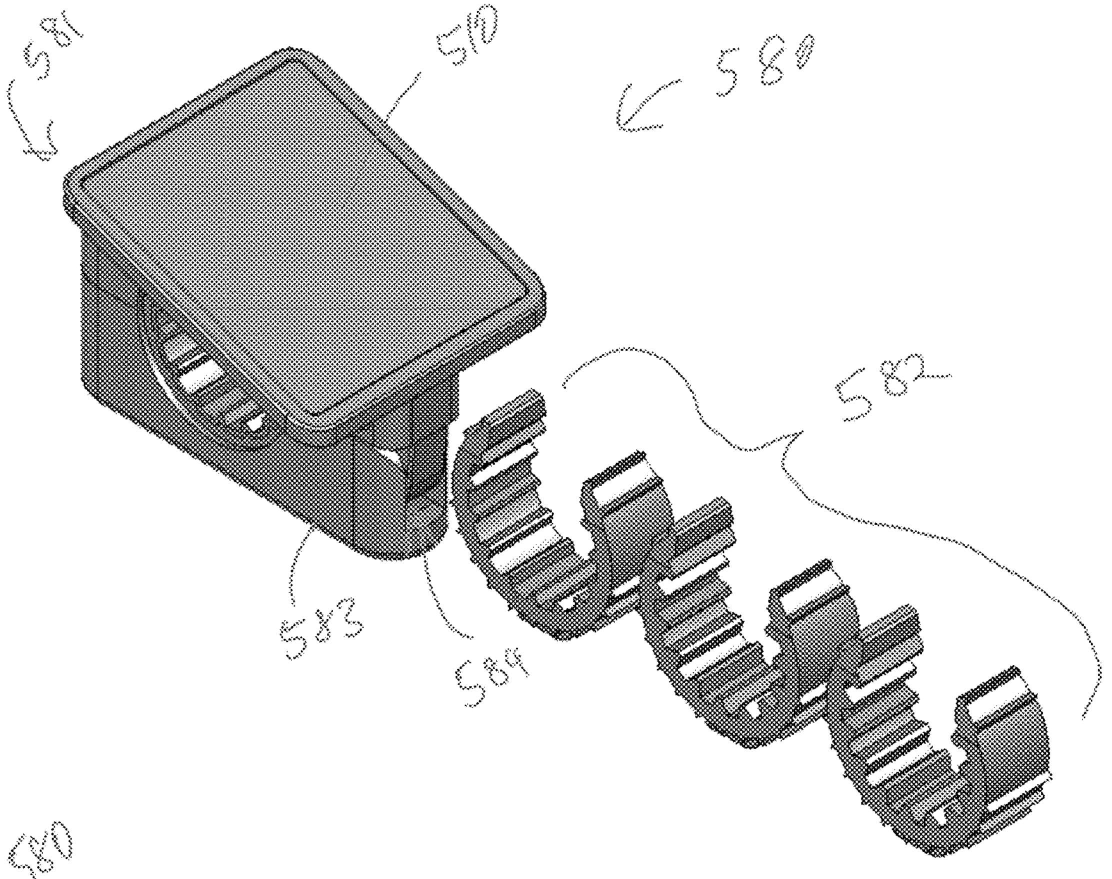
FIG. 5A is a perspective illustration of the clamp.
Figure 5B:
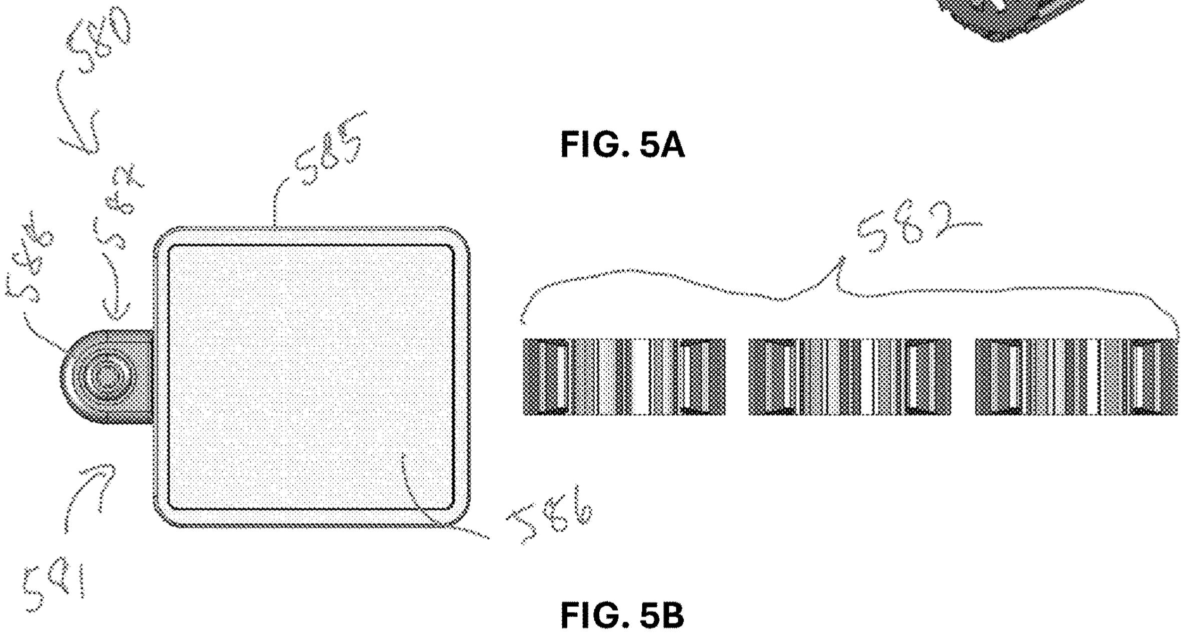
FIG. 5B is a top-view illustration of a clamp.
Figure 5C:
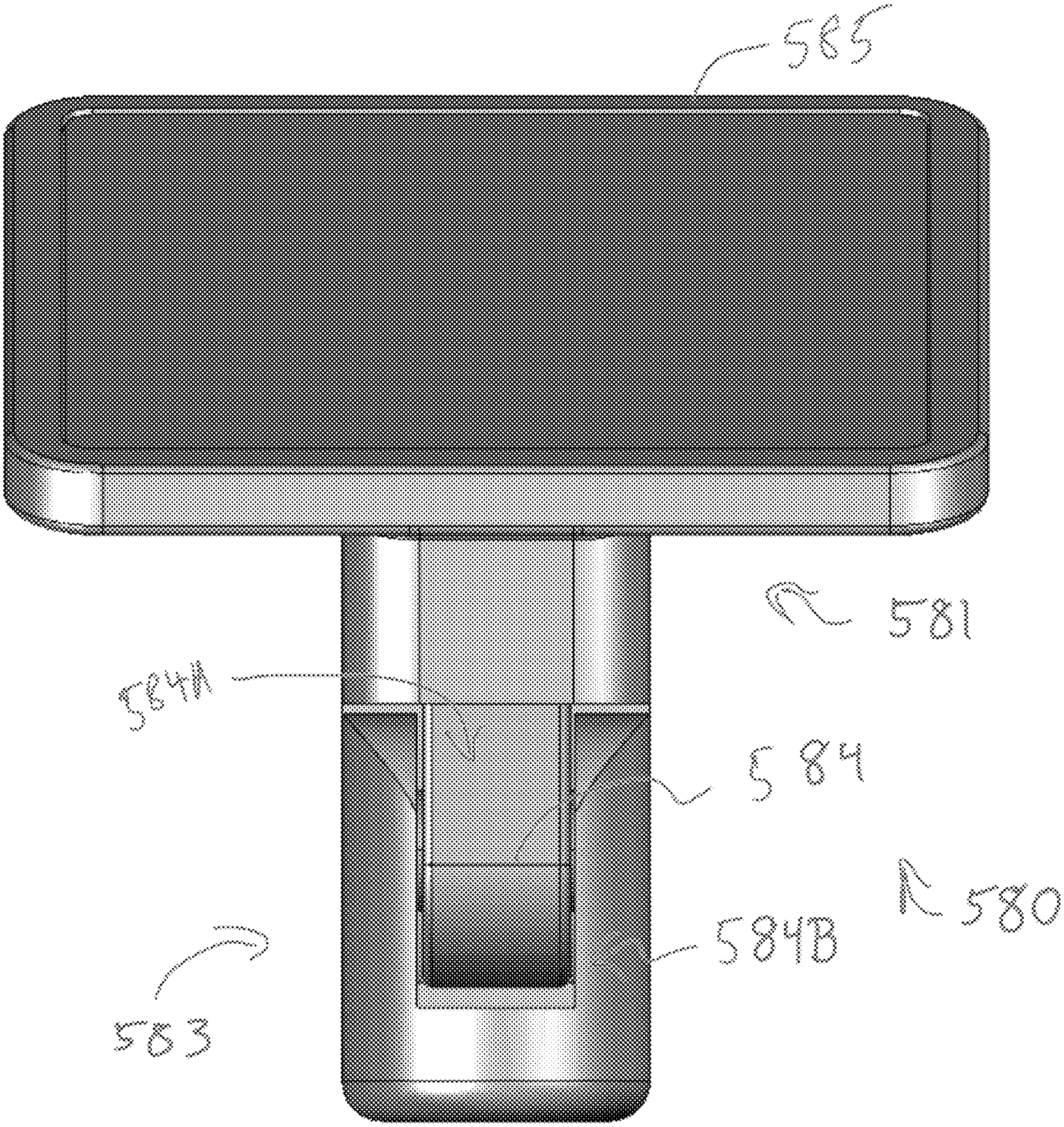
FIG. 5C is a front-view illustration of the clamp.
Figure 5D:
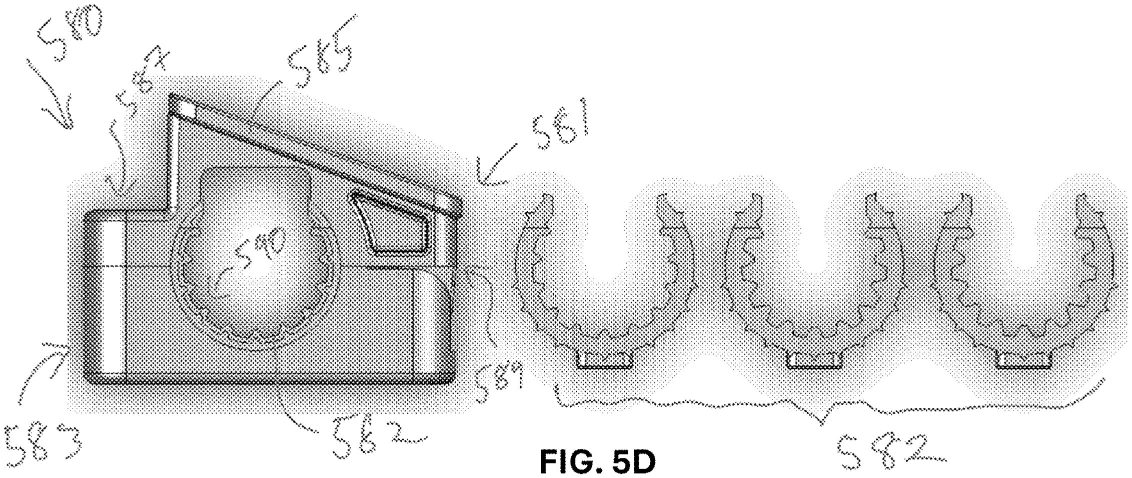
FIG. 5D is a side-view illustration of the clamp.
Figure 5E:
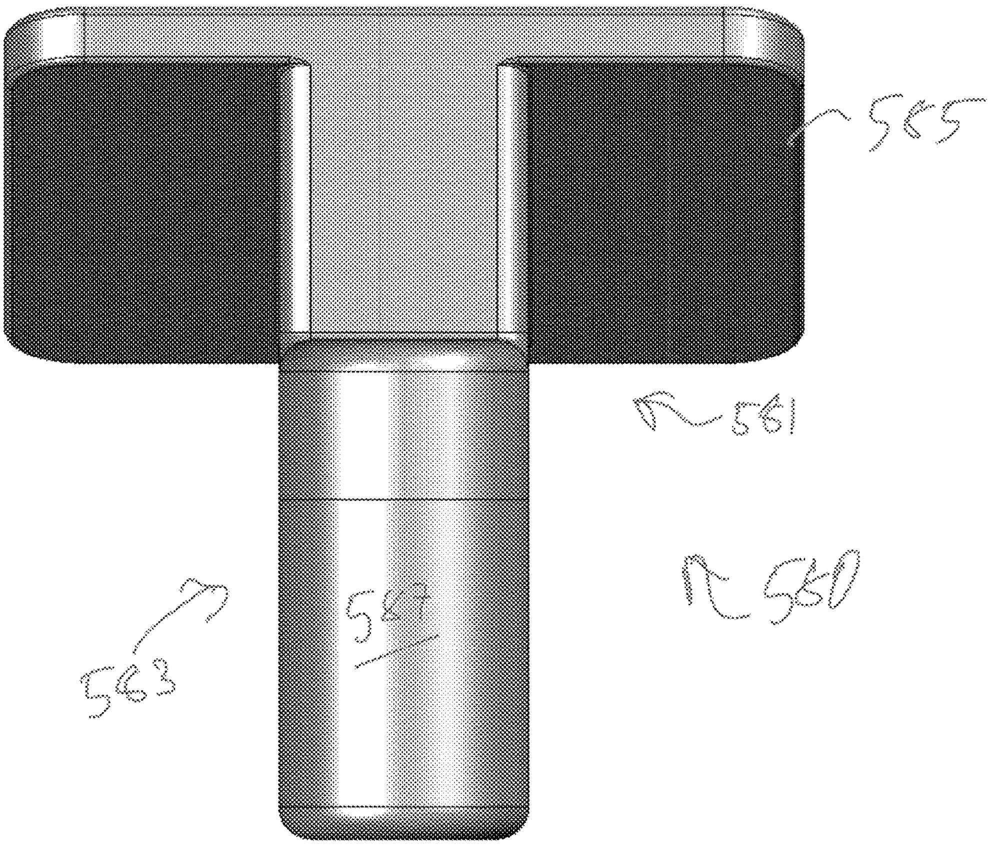
FIG. 5F is a bottom-view illustration of the clamp.
FIG. 5G is a perspective-view illustration of the clamp top.
FIG. 5H is a top-view illustration of the clamp top.
FIG. 5I is a front-view illustration of the clamp top.
FIG. 5J is a side-view illustration of the clamp top.
FIG. 5K is a rear-view illustration of the clamp top.
FIG. 5L is a bottom-view illustration of the clamp top.
FIG. 5M is a perspective-view illustration of the clamp base.
FIG. 5N is a top-view illustration of the clamp base.
FIG. 5O is a front-view illustration of the clamp base.
FIG. 5P is a side-view illustration of the clamp base.
FIG. 5Q is a perspective-view illustration of the clamp insert.
FIG. 5R is a top-view illustration of the clamp insert.
FIG. 5S is a front-view illustration of the clamp insert.
FIG. 5T is a bottom-view illustration of the clamp insert.
FIG. 5U is a side-view illustration of the clamp insert.
Figure 5F:
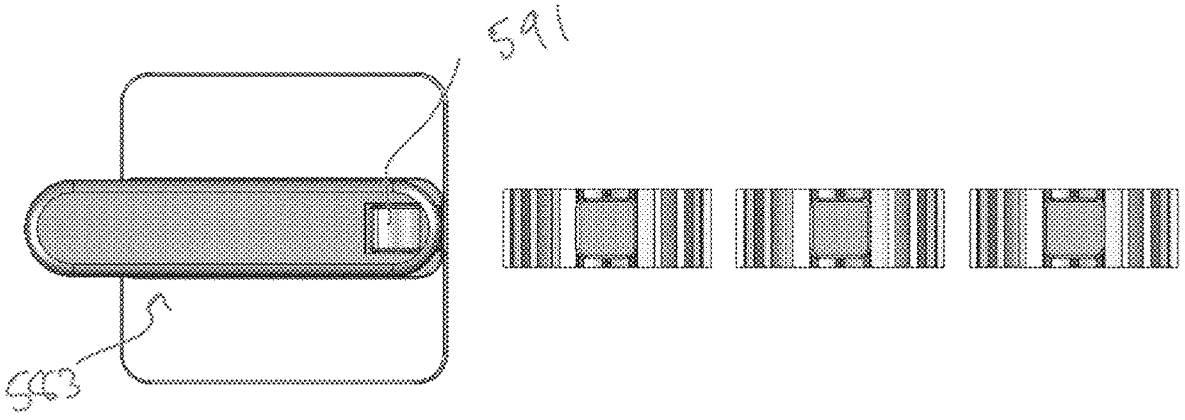
Figure 5G:
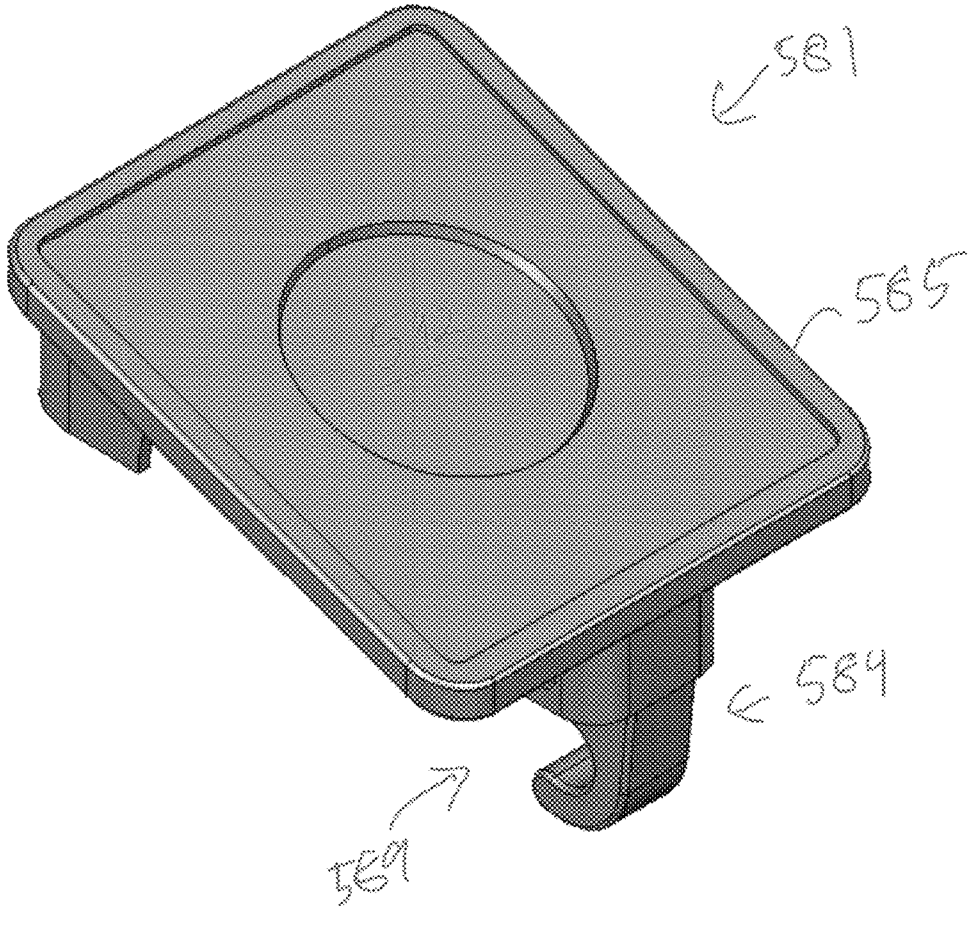
Figure 5H:
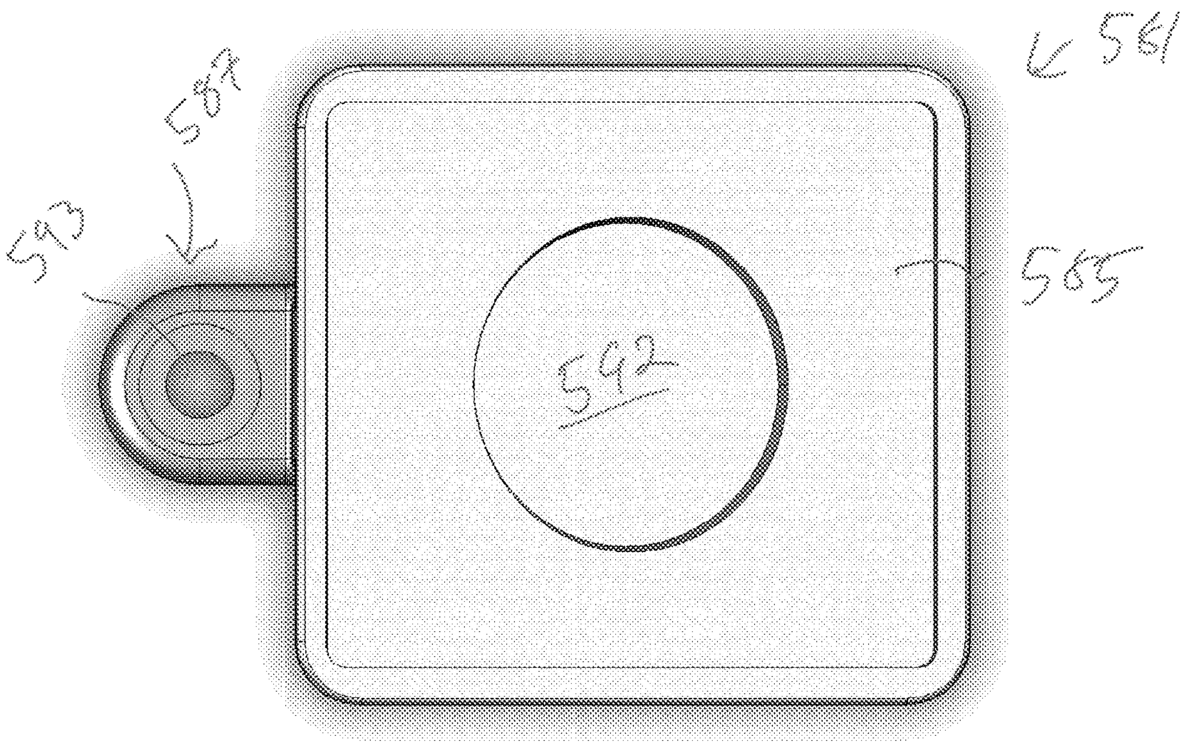
Figure 5L:
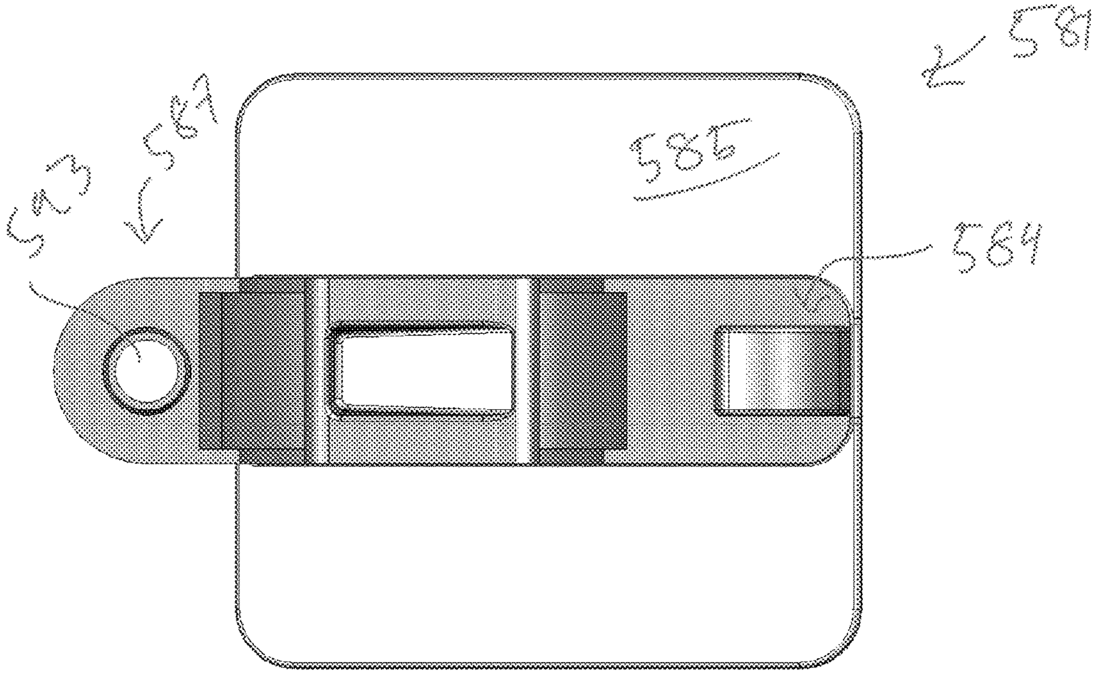
Figure 5I:
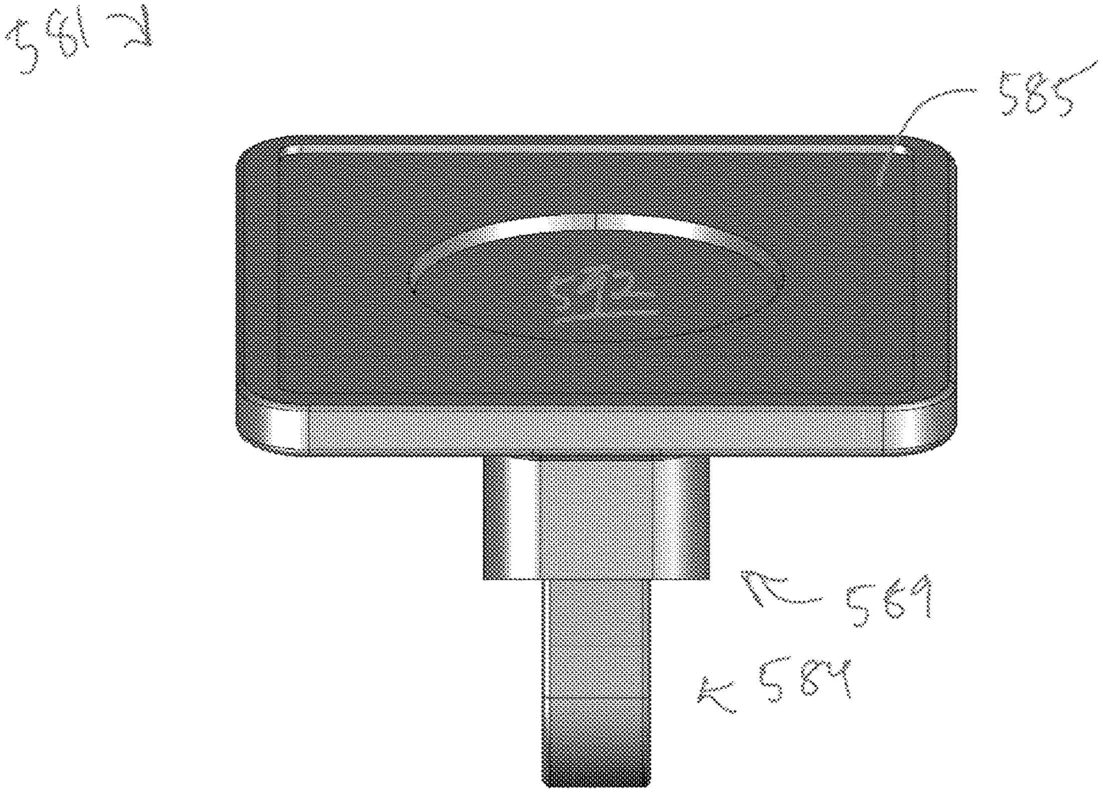
Figure 5J:
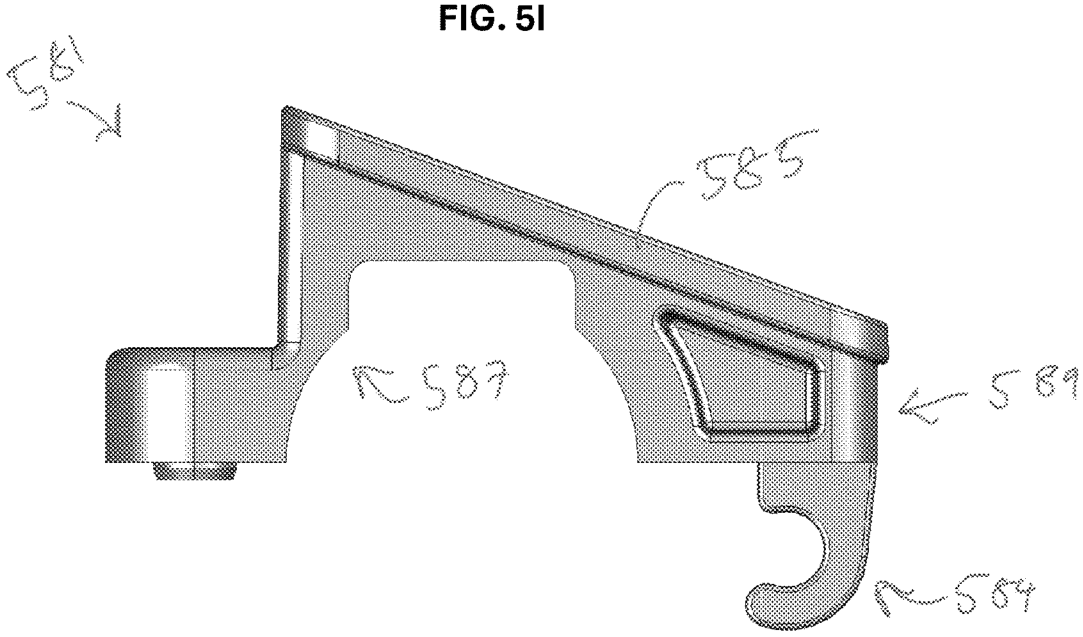
Figure 5K:
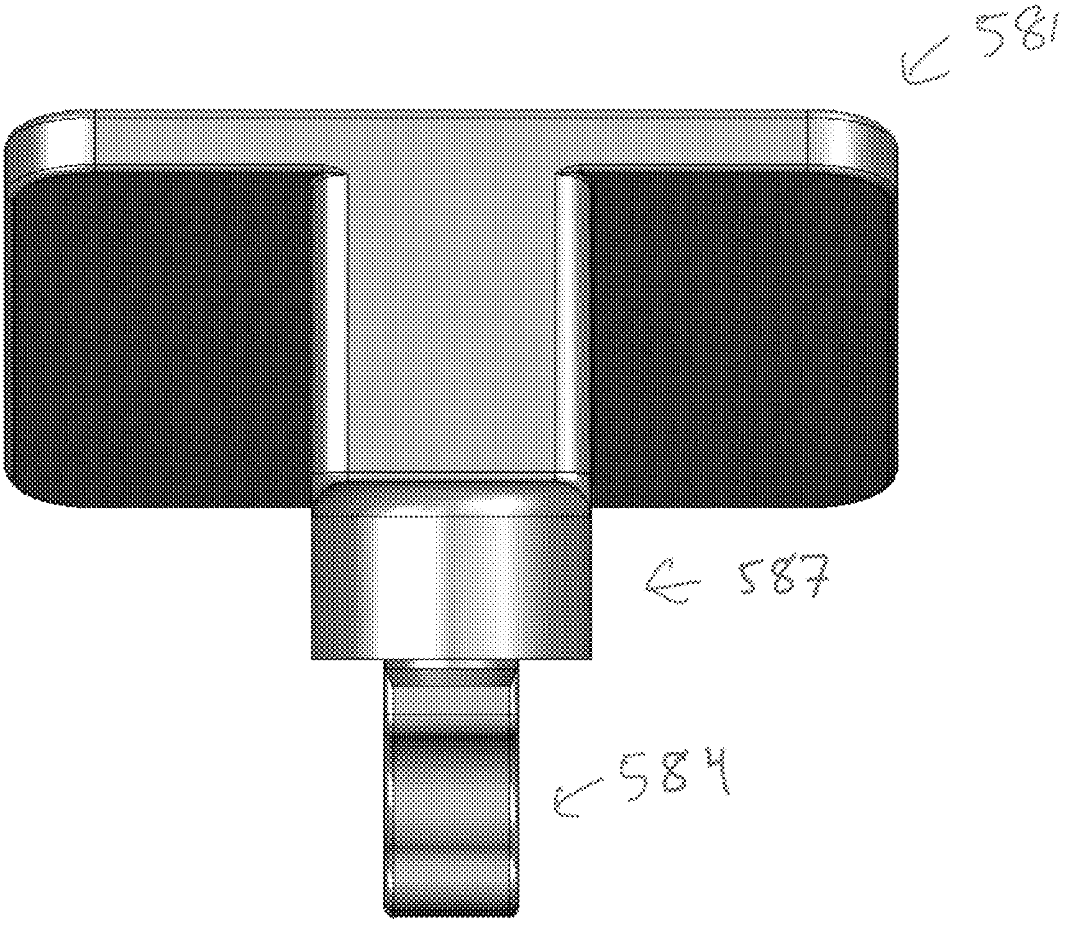
Figure 5M:
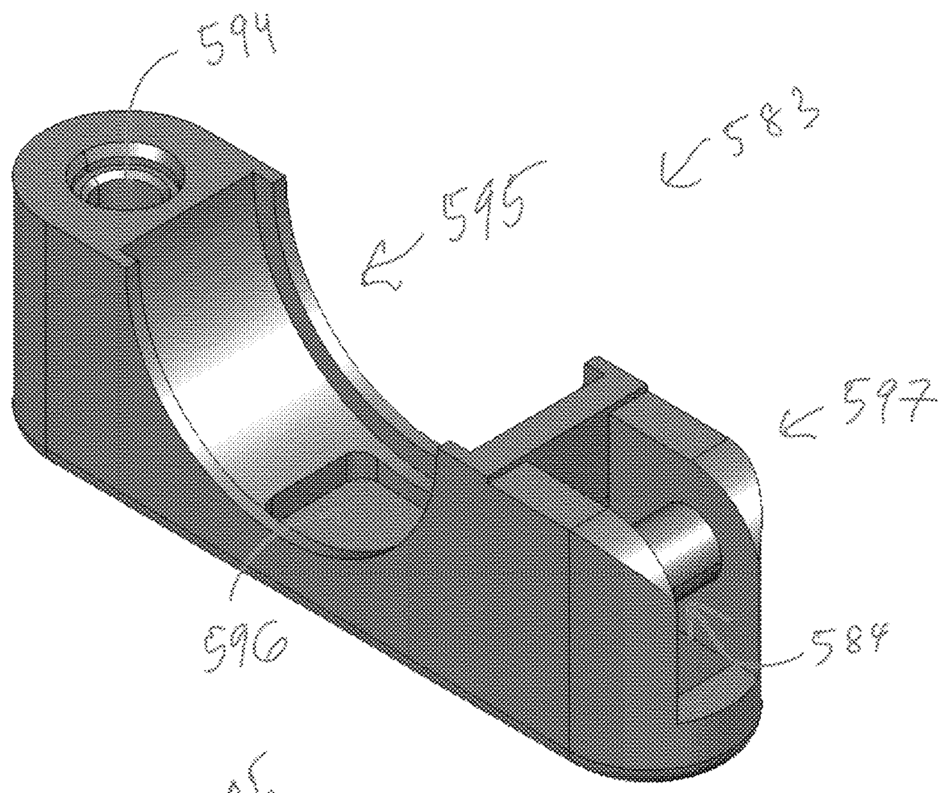
Figure 5N:
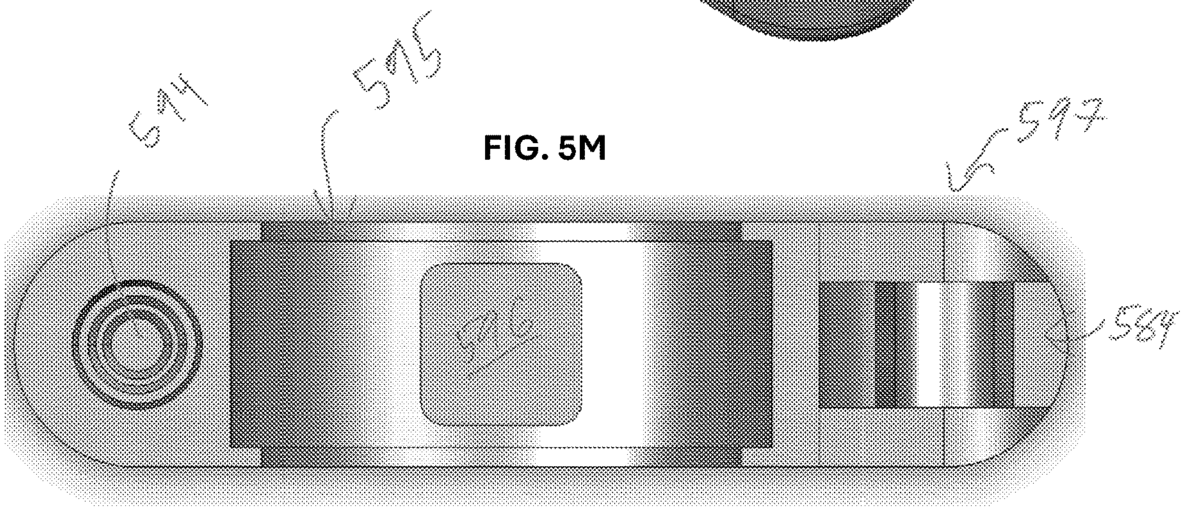
Figure 5O:
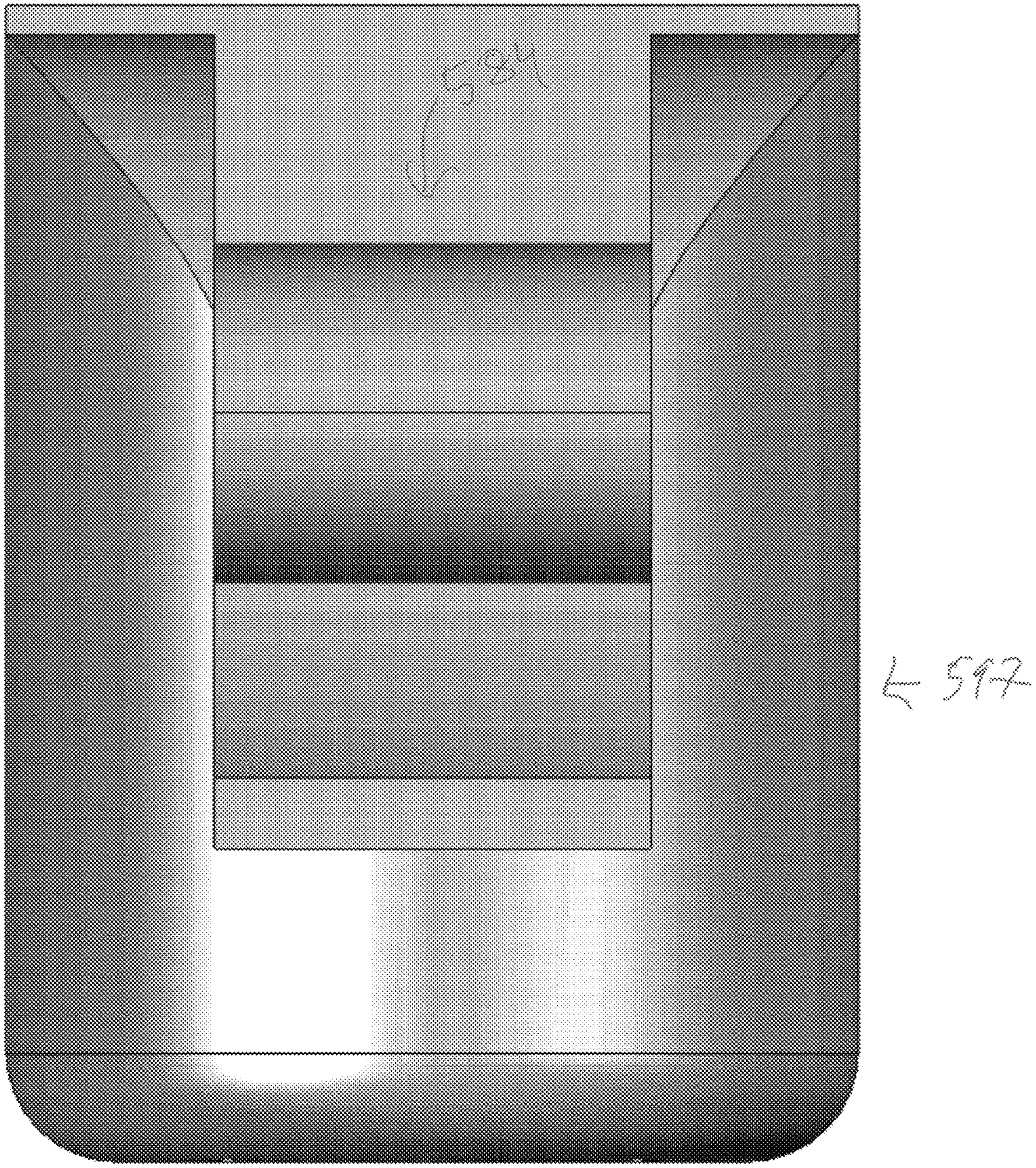
Figure 5P:
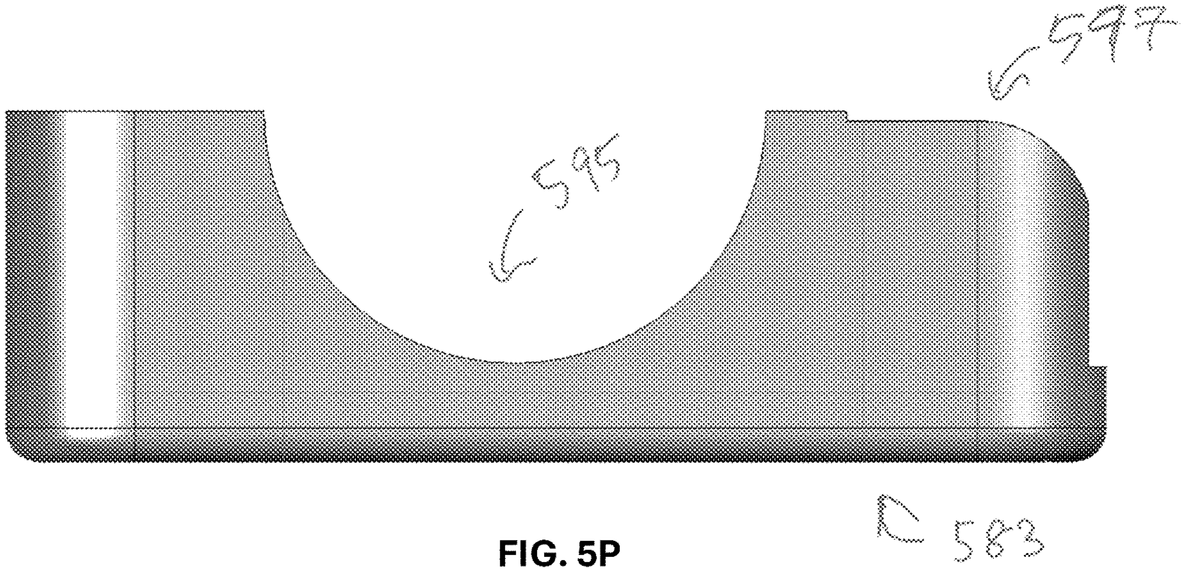
Figure 5Q:
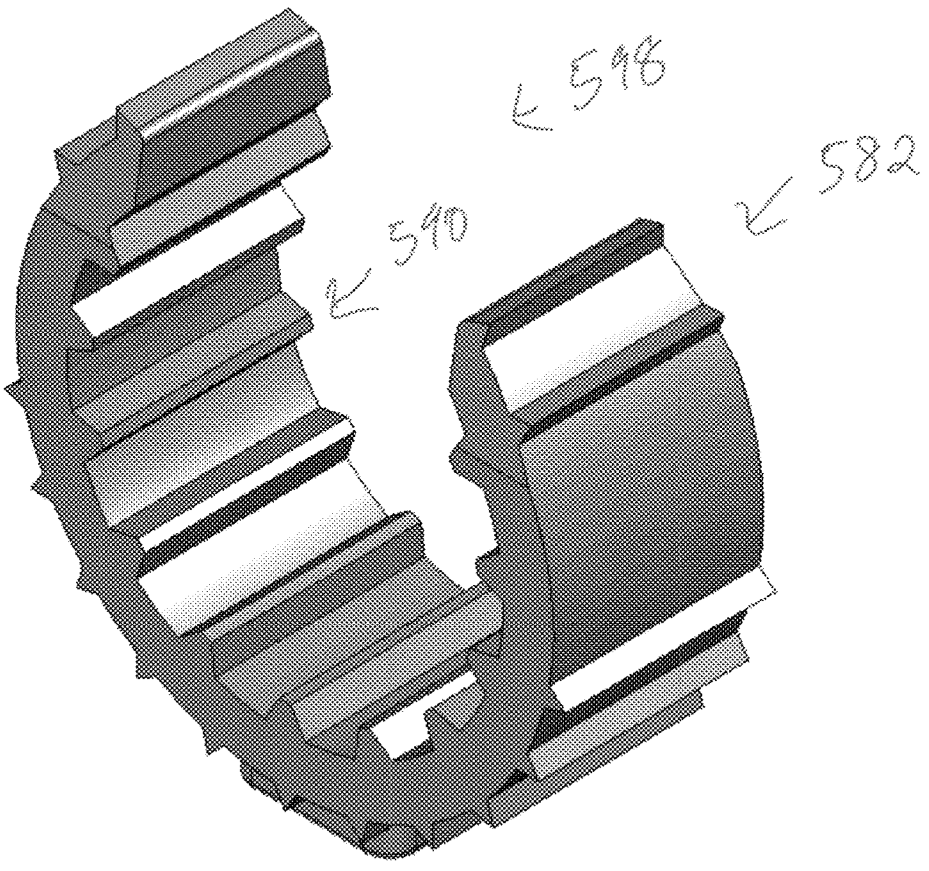
Figure 5R:
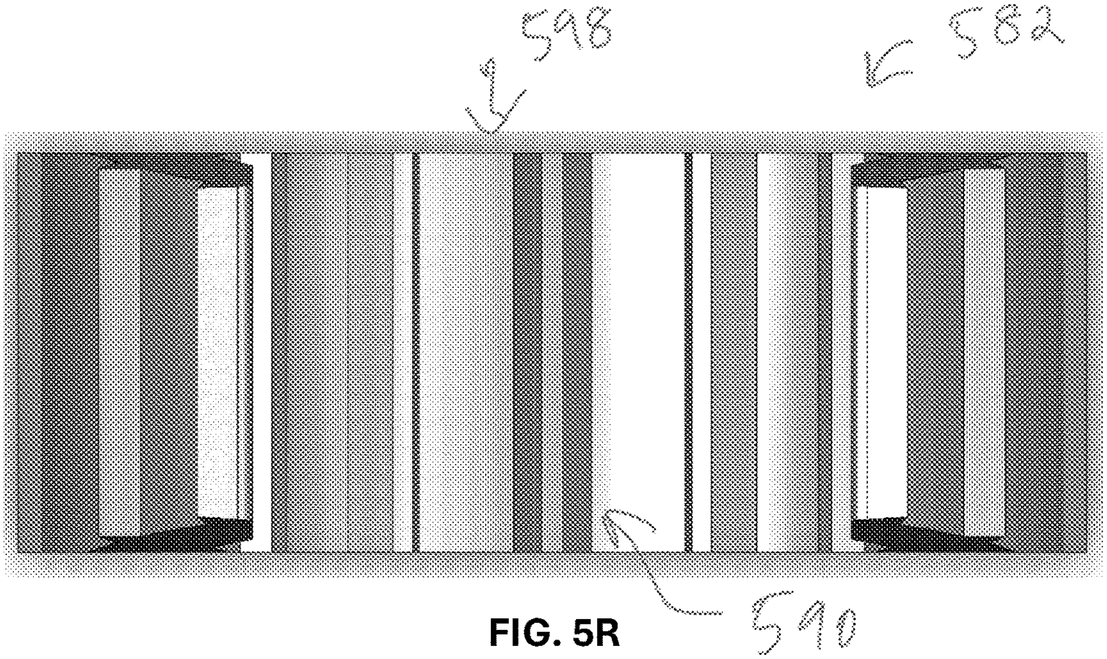
Figure 5T:
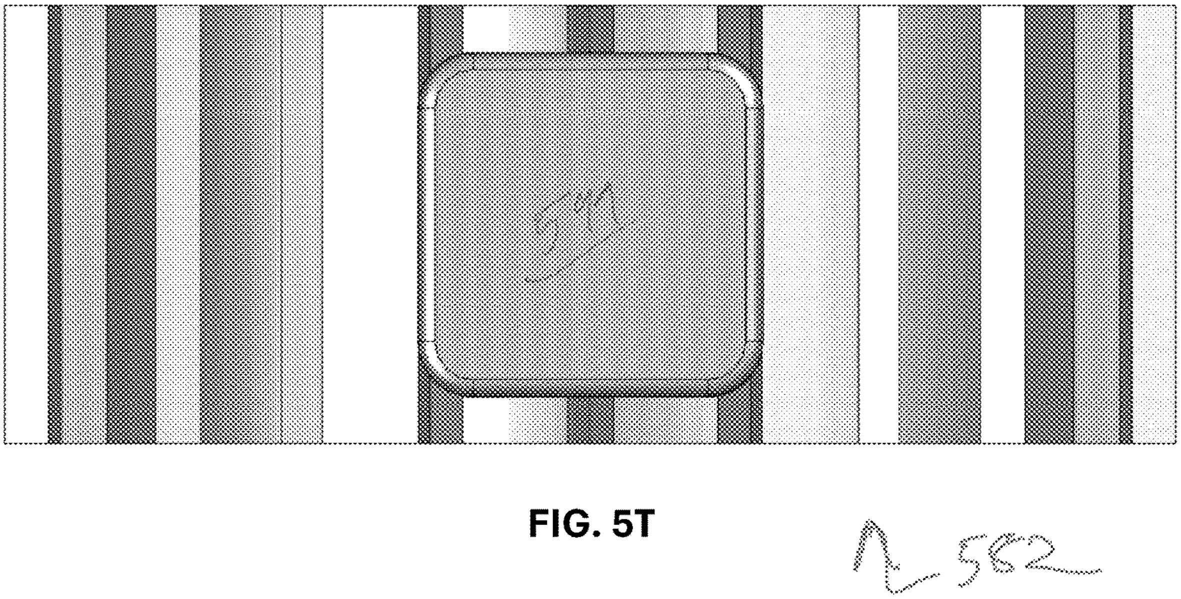
Figure 5S:
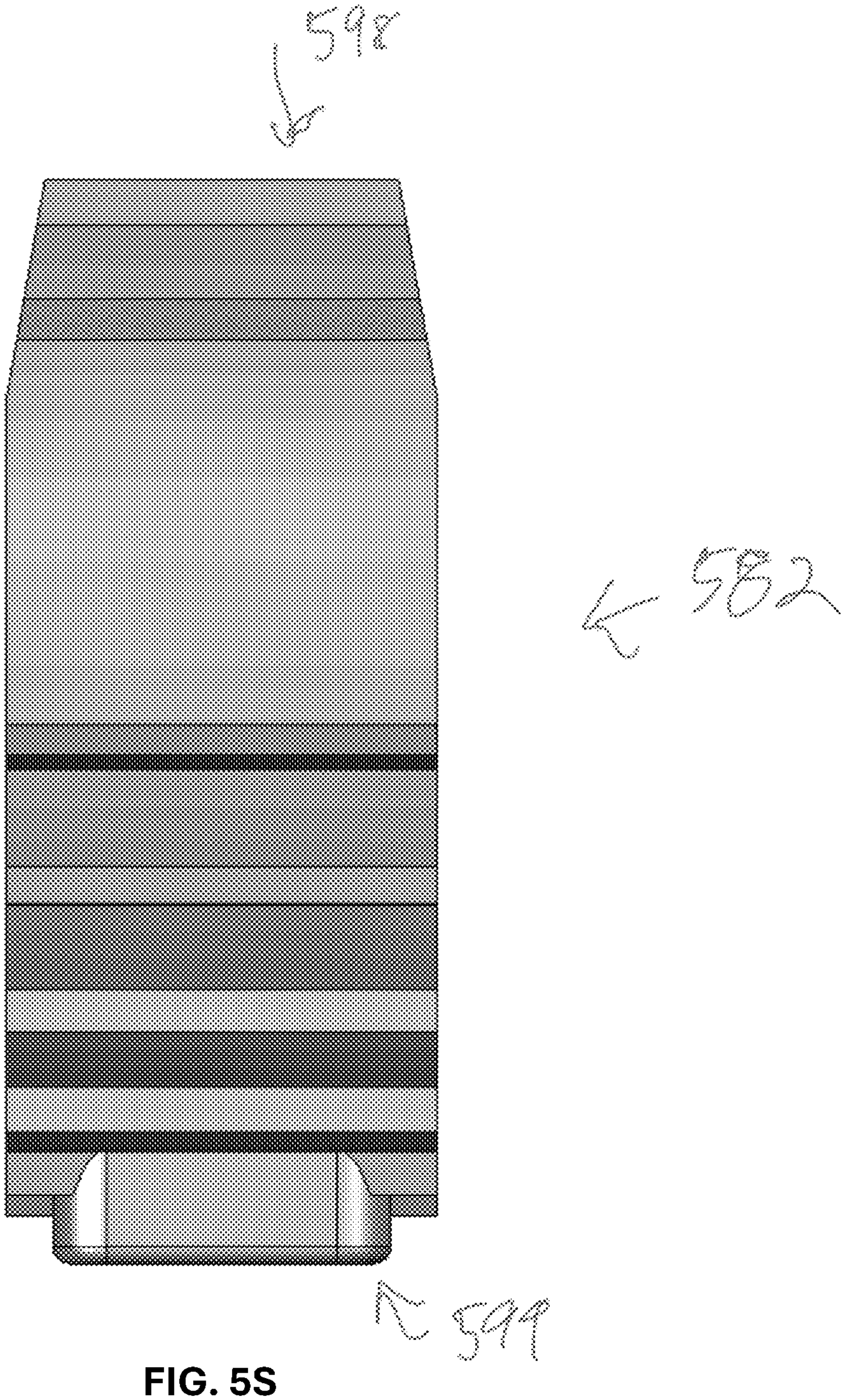
Figure 5U:
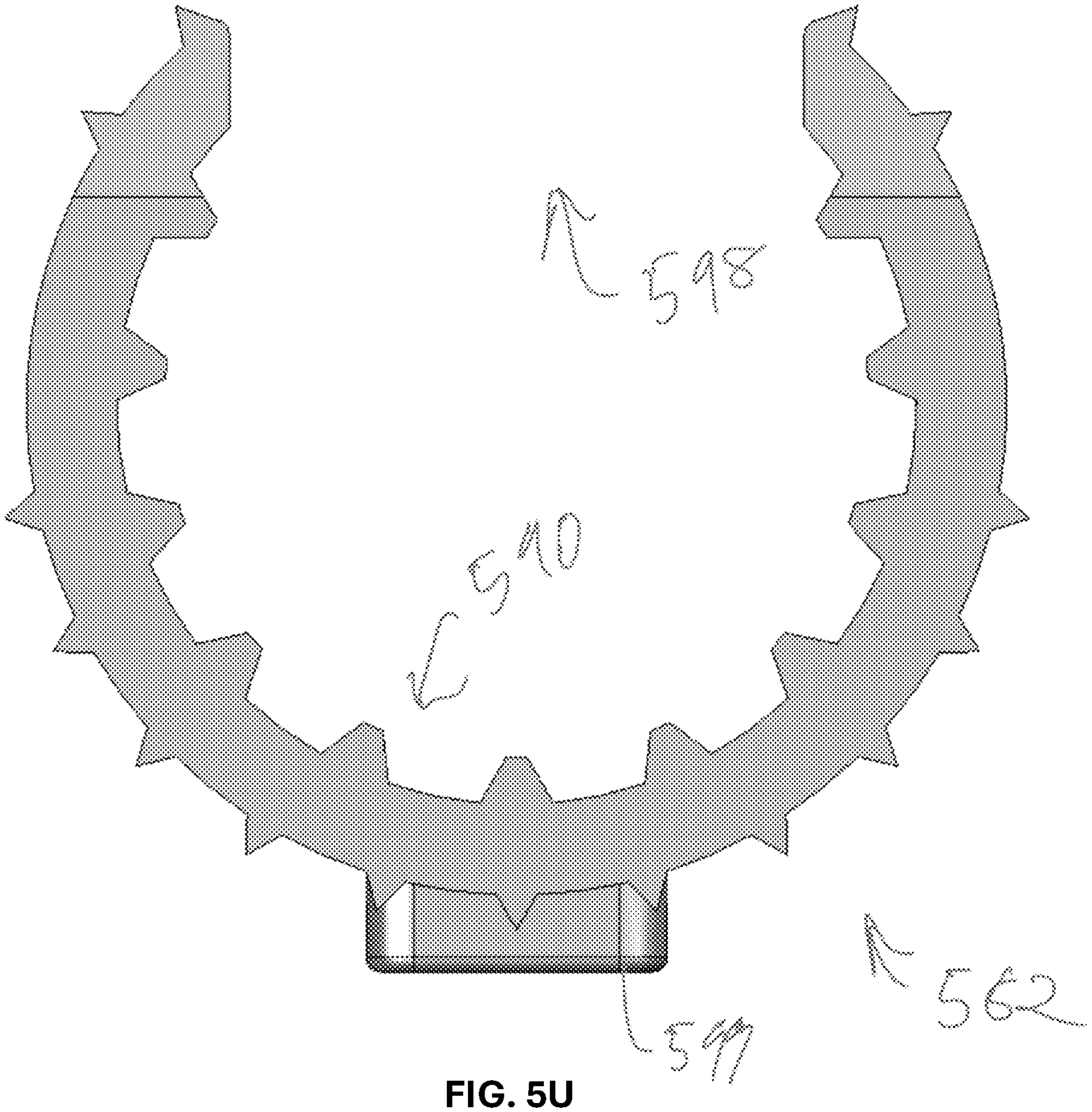

FIGS. 5A-5U are illustrations of a clamp 580. The clamp 580 may be the communications device 110 and 210 from FIGS. 1 & 2, and/or may incorporate elements of the clip 340 from FIGS. 3A-3F or the cap 460 from FIGS. 4A-4D. The clamp 580 can contain a communication device embedded within the clamp to allow it to objects that have a flat or relatively round, for example a shopping cart handle, steering wheel, or railings. As an example, the clamp 580 is designed to securely engage with a surface while allowing the communication device to be easily accessible for scanning and/or communication. The clip 340 may be made of metal, plastic, or other combinations of materials that ensure durability and usability. The embedded communication device, allows for writable and editable digital records with information such as a Uniform Record Locator (URL) or other digital identifier that is linked to a specific website or digital content, and in some examples may be encrypted. A user communication device (not illustrated) can access the URL or other digital identifier by scanning, tagging, or otherwise communicating with the cap, allowing the URL website and/or other digital identifiers to be displayed to a user via the user communication device, which can be, but is not limited to, a smartphone, tablet, or other web enabled device.

FIG. 5A is a perspective illustration of the clamp 580. The clamp 580 can allow for electronic communication via a communications device 510 found within the clamp top 581. In at least one embodiment, the clamp 580 is designed to be placed around a circular or generally rounded elements and secured in a manner that would not allow the clamp 580 to spin or rotate around the circular or generally rounded element. In at least one example, the clamp 580 can use an insert 582 that engages with the clamp base 583, and the clamp top 581 to secure the clamp 580 to the circular or generally rounded elements. The clamp top 581 can also include a rotation point 584 that allows the clamp top 581 to be separated from the clamp base 583 without causing complete separation of the clamp base 583 and the clamp top 581.

FIG. 5B is a top view illustration of clamp top 581. In some examples, the clamp top 581 can have a plate 585 that allows for a communications device to be secured or embedded (as illustrated here), and in the shown illustration the plate 585 may also include an advertising or messaging space 586. Additionally, the clamp top 581 can have an extension 587 that includes a securing void (not illustrated) and a fastening mechanism 588. A fastening mechanism can include a fastener such as a bolt or screw, which serves to securely join two or more components by creating a mechanical bond. These fasteners can include a head, a threaded, and in some examples a shank (unthreaded) portion, with the head designed to allow torque application via tools like wrenches or screwdrivers. Bolts often pair with nuts or tapped holes and may include washers to distribute load, while screws directly engage with the material, sometimes forming threads as they are installed. Thread characteristics, such as pitch, direction, and form, determine compatibility with specific applications. The fastening mechanism 588 can engage with the securing void allowing the clamp top 581 to be secured to the clamp base.

FIG. 5C is a front view illustration of the clamp 580. The clamp 580 can include a clamp top 581, and a clamp base 583 that can be coupled together at a rotation point 584. In at least one example the top portion 584A of the rotation point 584 is smaller than the base portion 584B of the rotation point 584 allowing the top portion 584A to be received by the base potion 584B. However, it would be understood, that these could be reversed without departing from the spirit of the present disclosure, as well as have equal portions place on opposite sides of one another. Additionally, in at least one example, the plate 585 can be a generally rectangular shape but may have rounded or straight edges, along with various angles that may allow it to be a polygon rather than a true square or rectangle. Similarly, while in some examples the plate 585 maybe placed horizontally, in others it may be placed at an angle that is deemed desirable to an average height user.

FIG. 5D is a side view illustration of the clamp 580. The clamp 580 can include a clamp top 581, an insert 582, and a clamp base 583. As seen in this illustration, the insert 582 can engage with both the clamp base 583 and the clamp top 581. The clamp top 581 can have the extension 587, the plate 585, and the rotation extension 589. The extension 587 and the rotation extension 589 can interface with respective portions of the clamp base 583. The clamp base 583 can engage with the insert 582 and receive a portion of the clamp top 581. The insert 582 can have a set of teeth 590 that can engage with a generally round element, and allow for securing the clamp 580. The insert 582 can be generally round and circular with an open on the top side of the circle.

FIG. 5E is a rear view illustration of the clamp 580. The clamp 580 can include a clamp top 581 that has a plate 585, and an extension 587. The extension 587 can engage with the clamp base 583 through a fastening mechanism.

FIG. 5F is a bottom view illustration of the clamp 580. The clamp base 583 can have a rotational void 591 that allows for viewing, repair, and/or installation of the rotational mechanism and/or engagement between the clamp top and the clamp base 583.

FIG. 5G is a perspective view illustration of the clamp top 581. FIG. 5H is a top view illustration of the clamp top 581. FIG. 5I is a front view illustration of the clamp top 581. FIG. 5J is a side view illustration of the clamp top 581. FIG. 5K is a rear view illustration of the clamp top 581. FIG. 5L is a bottom view illustration of the clamp top 581. With respect to these figures, the clamp top 581 can include a plate 585, an extension 587, and the rotational point 584 (illustrated as one half, where if both were illustrated they would be 584A/584B). The extension 587 can include a securing void 593 for receiving a fastener mechanism. In at least one example, the rotational extension 589 with a rotational portion 584 shown as a hook or J, however it would be understood, that the hook could be a full loop or circle that creates a void, or could be other engageable shapes or configurations that allow for rotational movement. Additionally, the plate 585 is shown with a chip void 592, which allows for a communication device (not illustrated) to be placed and/or engaged. Other examples, may have the communications device embedded within the plate 585.

FIG. 5M is a perspective view illustration of the clamp base 583. FIG. 5N is a top view illustration of the clamp base 583. FIG. 5O is a front view illustration of the clamp base 583. FIG. 5P is a side view illustration of the clamp base 583. The clamp base 583 can have the receiving void 594 configured to receive a fastener mechanism (not illustrated), an insert engagement section 595, an insert point void 596, and the rotational extension 597 with a rotational portion 584 illustrated as a rod for a hook to wrap around, however this could be a rod that passes through a void of a rotational portion of the clamp top.

FIG. 5Q is a perspective view illustration of the clamp insert 582. FIG. 5R is a top view illustration of the clamp insert 582. FIG. 5S is a front view illustration of the clamp insert 582. FIG. 5T is a bottom view illustration of the clamp insert 582. FIG. 5U is a side view illustration of the clamp insert 582. With respect to these figures, the clamp insert 582 can have a generally circular shape with an opening 598 at the top to allow the insert to receive a generally round shaft or element. Portions of the outer surface and the inner surface of the clamp insert 582 can have a set of teeth 590. While illustrated as triangles, it would be understood that these could take different shapes, dimensions, patters, that allow for gripping, and/or engagement with other surfaces. Additionally, there can be the insert point 599 that can be configured to allow for the positioning of the insert 582 within a clamp base.

The present disclosure may include a computing device that can include any of an application specific integrated circuit (ASIC), a microprocessor, a microcontroller, a digital signal processor (DSP), a field-programmable gate array (FPGA), or equivalent discrete or integrated logic circuitry. In some examples, the system may include multiple components, such as any combination of one or more microprocessors, one or more microcontrollers, one or more DSPs, one or more ASICs, or one or more FPGAs. It would also be understood that multiples of the circuits, processors, or controllers could be used in combination or in tandem, or multithreading. Additionally, it would be understood that a browser or program could be implemented on a mobile device or mobile computing device, such as, a phone, a mobile phone, a cell phone, a tablet, a laptop, a mobile computer, a personal digital assistant ("PDA"), a processor, a microprocessor, a micro controller, or other devices or electronic systems capable of connecting to a user interface and/or display system. A mobile computing device or mobile device may also operate on or in the same manner as the computing device disclosed herein or be based on improvements thereof.

The components of the present disclosure may include any discrete and/or integrated electronic circuit components that implement analog and/or digital circuits capable of producing the functions attributed to the modules herein. For example, the components may include analog circuits, e.g., amplification circuits, filtering circuits, and/or other signal conditioning circuits. The components may also include digital circuits, e.g., combinational or sequential logic circuits, memory devices, etc. Furthermore, the modules may comprise memory that may include computer-readable instructions that, when executed cause the modules to perform various functions attributed to the modules herein.

Memory may include any volatile, non-volatile, magnetic, or electrical media, such as a random-access memory (RAM), dynamic random-access memory (DRAM), static random-access memory (SRAM), read-only memory (ROM), non-volatile RAM (NVRAM), electrically-erasable programmable ROM (EEPROM), flash memory, hard disks, or any other digital media. Additionally, there may also be a tangible non-transitory computer readable medium that contains machine instructions, such as, a (portable or internally installed) hard drive disc, a flash drive, a compact disc, a DVD, a zip drive, a floppy disc, optical medium, magnetic medium, or any other number of possible drives or discs, that are executed by the internal logic of a computing device. It would be understood that the tangible non-transitory computer readable medium could also be considered a form of memory or storage media.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:

1. A system for communication comprising:
- a near field communication (NFC) device, and the NFC device having a computing device, a multi-channel communications device, a communications bus, an energy conditioner, and a power storage device, wherein the NFC device includes a quick response (QR) code on it;
- a housing to contain the NFC device; and
- a user communications device that can be activated by the NFC device when held in close proximity of the housing, wherein the user communications device also includes an imaging system;
- wherein the housing is a clamp, and wherein the clamp comprises a base, a top, an insert, and a top plate; and wherein the base of the clamp receives the insert that is sized to secure the base around a circular object, and the insert engages with the top of the clamp which receives the NFC device, and allows for the top plate to be secured to the top of the clamp.

2. The system for communication of claim 1, wherein the clamp is made of plastic.

3. The system for communication of claim 1, wherein the clamp is made of metal.

4. The system for communication of claim 1, wherein the insert further comprises a set of teeth.

5. The system for communication of claim 1, wherein the top of the clamp further comprises an extension and a rotational point.

6. A system for communication of elaim 6,comprising:
- a near field communication (NFC) device, and the NFC device having a computing device, a multi-channel communications device, a communications bus, an energy conditioner, and a power storage device, wherein the NFC device includes a quick response (QR) code on it;
- a housing to contain the NFC device; and
- a user communications device that can be activated by the NFC device when held in close proximity of the housing, wherein the user communications device also includes an imaging system;
- wherein the housing is a clip; and wherein the clip comprises a first chip section, a first connection section, an inflection section, a second connection section, and a section chip section and wherein the first chip section of the clip is coupled to the first connection section that extends to the inflection section that is rounded and allows for coupling to the second connection section which couples to the second chip section, wherein the first and second chip sections along include a set of interface devices that secure the clip to an object.

7. The system for communication of claim 6, wherein the first chip section contains the NFC device.

8. The device for communication of claim 6, wherein the first chip section and the second chip section oppose one another.

9. The device for communication of claim 6, wherein the first connection section and the second connection section oppose one another.

10. A device for communication comprising:
- a computing device;
- a multi-channel communications device coupled to the computing device;
- a communications bus coupled to the multi-channel communications device;
- a power conditioner coupled to the computing device; and
- an energy storage device; wherein the device for communication includes a quick response (QR) code on it;
- the device further comprising a housing, wherein the housing is a clamp and wherein a base of the clamp receives an insert that is sized to secure the base around a circular object, and the insert engages with a top of the clamp which receives the NFC device, and allows for a top plate to be secured to the top of the clamp.

11. The device for communication of claim 10, wherein the computing device and multi-communications device are configured as a near field communications (NFC) communication device.

12. The device for communication of claim 10, wherein the clamp is made of plastic.

13. The device for communication of claim 10, wherein the clamp is made of metal.

14. The device for communication of claim 10, wherein the insert further comprises a set of teeth.

15. The device for communication of claim 10, wherein the top plate is coupled to an extension and a rotational point.

16. A device for communication comprising:
a computing device;
a multi-channel communications device coupled to the computing device;
a communications bus coupled to the multi-channel communications device;
a power conditioner coupled to the computing device; and
an energy storage device; wherein the device for communication includes a quick response (QR) code on it;
the device further comprising a housing, wherein the housing is a clip, and wherein a first chip section of the clip is coupled to a first connection section that extends to an inflection section that is rounded and allows for coupling to a second connection section which couples to a second chip section, wherein the first and second chip sections along include a set of interface devices that secure the clip to an object.

17. The device for communication of claim 16, wherein the computing device and multi-communications device are configured as a near field communications (NFC) communication device.

18. The device for communication of claim 16, wherein the first chip section and the second chip section oppose one another.

19. The device for communication of claim 16, wherein the first connection section and the second connection section oppose one another.

* * * * *